United States Patent [19]
Afek et al.

[11] Patent Number: 5,956,340
[45] Date of Patent: Sep. 21, 1999

[54] SPACE EFFICIENT FAIR QUEUING BY STOCHASTIC MEMORY MULTIPLEXING

[75] Inventors: Yehuda Afek, Hod Hasaron; Yishay Mansour, Tel Aviv; Zvi Ostfeld, Ramat Gan, all of Israel

[73] Assignee: Ramot University Authority for Applied Research and Industrial Development Ltd., Tel Aviv, Israel

[21] Appl. No.: 08/906,390

[22] Filed: Aug. 5, 1997

[51] Int. Cl.$^6$ .................................................. H04L 12/28
[52] U.S. Cl. ............................................. 370/412; 710/56
[58] Field of Search ..................................... 370/468, 412, 370/413, 417, 418, 428, 429, 229, 230, 231, 235, 395; 710/56

[56] References Cited

U.S. PATENT DOCUMENTS

| | | | |
|---|---|---|---|
| 5,381,413 | 1/1995 | Tobagi et al. | 370/448 |
| 5,732,087 | 3/1998 | Lauer et al. | 370/416 |
| 5,859,835 | 1/1999 | Varma et al. | 370/229 |

OTHER PUBLICATIONS

Jain, R., "Congestion Control and Traffic Management in ATM Networks: Recent Advances and a Survey", *Computer Networks and ISDN Systems*, Feb. 1995.
Demers et al., "Analysis and Simulation of a Fair Queueing Algorithm", *Proc. SIGCOMM*. pp. 1–12, (1989).
Kung et al., Credit–Based Flow Control for ATM Networks, *IEEE Networks*, 9(2): 40–48 (1995).
McKenney, P. "Stochastic Fairness Queueing", *Internetworking: Research and Experience*, 2:113–131 (1991).
Nagle, J., "On Packet Switches with Infinite Storage", *IEEE/ACM Trans. On Communications*, 35(4): 535–438, (1987).
Keshav, S., "A Control–Theoretic Approach to Flow Control", *Proc. SIGCOMM*, pp. 3–16 (1991).
Shreedhar et al., "Efficient Fair Queueing Using Deficit Round Robin", *IEEE/ACM Trans. On Networking*, 4(3):375–385 (1996).

*Primary Examiner*—Hassan Kizou
*Assistant Examiner*—Mitchell Slavitt
*Attorney, Agent, or Firm*—Mark M. Friedman

[57] ABSTRACT

A method for multiplexing the buffer space used to store messages of backlogged flows at the output port of a switch. The buffer space is partitioned among queues of variable length, with the first queue long enough to accommodate the largest expected backlog, the second queue long enough to accommodate the second-largest expected backlog, etc. Messages are dequeued from the queues for transmission in Round-Robin order. Incoming messages are enqueued in a manner that guarantees that messages of heavily backlogged flows tend to be enqueued in the longer queues, while preserving FIFO message order. If the messages are all of the same length, then the queues are partitioned into locations, of the same length as the messages, each location having an ordinal index in its queue, and the messages are enqueued so that each message of a particular flow is enqueued in a location with a different ordinal index. If the messages are of different lengths, the queues are partitioned into bins large enough to accommodate the longest messages, one or more messages may be stored in each bin, the round in which each incoming message is to be transmitted is computed in advance, and a similar enqueueing algorithm is used that is based on matching successive transmission rounds of messages of a given flow to successively indexed bins of different queues. The present invention may be used in any application involving Round Robin scheduling.

28 Claims, 10 Drawing Sheets

Constants:
$Envelope[1..F]$: array of integers {length of each queue, $F$ is the number of queues}
Variables:
$LeftMost[1..m]$: array of integers {$m$ is the maximum queue length;
 LeftMost is a circular array of integers, see [AHUa] page 58}
$length[1..\#flows]$: array of integers
$Q'[1..F]$: array of message-queues {size (queue $Q'[i]$)= $Envelope[i]$}
$sum$: integer {# of messages stored in $Q'$. Initialized as 0.}

---

*function* Insert ($fid$:flow_id, $in\_msg$:message)
  if ($length[fid] = 1$)  {$fid$ not backlogged}
  then $Set\_Serviced(fid)$ fi
  if $Was\_Serviced(fid)$
  then $q' := length[fid]$
  else $q' := length[fid] - 1$ fi
  if ($Overflow(q')$) then Return(False)
  else
    enqueue ($in\_msg$, $Q'[LeftMost[q']]$)
    $LeftMost[q'] := LeftMost[q'] + 1$
    $length[fid] := length[fid] + 1$
    $sum := sum + 1$
    Return(True) fi
end of *function* Insert

*function* Overflow ($q'$:integer)
  if ($LeftMost[q'] > F$)
  then return (TRUE)
  else if ($q' > Envelope[LeftMost[q']]$)
  then return (TRUE)
  else return (FALSE) fi
end of *function* Overflow

*function* Remove ()
  Variables:
  $N := 1$, $qptr := 1$: static integers
  {The value of a static variable is maintained
                between function invocations} if ($sum > 0$) then  {$Q'$ is not empty}
    if ($qptr = N$) then  {Start new round}
      $N :=$ dequeue ($LeftMost$)
      enqueue (1, $LeftMost$)
      $Not\_Serviced\_All()$
      $qptr := 1$
  fi
  $msg :=$ dequeue ($Q'[qptr]$)
  $Set\_Serviced(msg.flow)$
  $length[msg.flow] :=$
                            $length[msg.flow] - 1$
  $qptr := qptr + 1$
  $sum := sum - 1$
  Return ($msg$)
  fi
end of *function* Remove

Fig. 3

Constants:
  $Envelope[1..F]$: array of integers          {length of each queue, $F$ is the number of queues}
Variables:
  $LeftMost[1..m]$: array of integers          {$m$ is the maximum queue length;
                    LeftMost is a circular array of integers, see [AHUa] page 58}
  $length[1..\#flows]$: array of integers
  $Q'[1..F]$: array of message-queues          {size (queue $Q'[i]$)= Envelope[i]}
  $parity$: boolean                             {parity of current round}
  $perm[0..1][1..\#flows]$: array of of flow_id    {$perm[parity]$=current permutation
                                                 $perm[1-parity]$=next permutation}
  $next[F+1]$: array of flow_id       {next flow to be serviced according to the circular order.
                    Initialized with flow_id $EOR$ which indicates end of round}
  $sum$: integer                                {# of messages stored in $Q'$. Initialized as 0.}

--- function Insert ($fid$:flow_id, $in\_msg$:message)
  if ($length[fid] = 1$) then
    Set_Serviced($fid$)   {$fid$ not backlogged}
    enqueue($next, fid$) fi
  if Was_Serviced($fid$)
  then $q' := length[fid]$
  else $q' := length[fid] - 1$ fi
  if (Overflow($q'$)) then Return(False)
  else
    enqueue ($in\_msg, Q'[LeftMost[q']]$)
    if ($q' = 1$) then
      $perm[1 - parity][fid] := LeftMost[1]$ fi
    $LeftMost[q'] := LeftMost[q'] + 1$
    $length[fid] := length[fid] + 1$
    $sum := sum + 1$
    Return(True) fi
end of function Insert function Overflow ($q'$:integer)
  if ($LeftMost[q'] > F$)
  then return (TRUE)
  else if ($q' > Envelope[LeftMost[q']]$)
  then return (TRUE)
  else return (FALSE) fi
end of function Overflow

--- function Remove ()
  if ($sum > 0$) then       {$Q'$ is not empty}
    $id := dequeue(next)$
    if ($id = EOR$) then{Start new round}
      $N :=$ dequeue ($LeftMost$)
      enqueue (1, $LeftMost$)
      Not_Serviced_All()
      $parity := 1 - parity$
      enqueue($next, EOR$)
      $id := dequeue(next)$
    fi
    $qptr := perm[parity][id]$
    $msg :=$ dequeue ($Q'[qptr]$)
    Set_Serviced($msg.flow$)
    $length[msg.flow] :=$
                $length[msg.flow] - 1$
    if ($qptr \leq LeftMost[1]$) then
      $perm[1 - parity][head(Q'[qptr]).flow]$
                                 $:= qptr$ fi
    $sum := sum - 1$
    Return ($msg$)
  fi
end of function Remove

Fig. 5

Constants:
  $F$ {# columns in $Q'_{bin}$}, #flows, $m$ {# rows in $Q'_{bin}$}, Quantum, $BS$    of type integer
  dummy                                                                              of type message
  Envelope[1..F] {length of each column}                                              of type array of integers
  in_bin = 0, out_bin = 1                                                             of type integer Variables:
  ref, fid                                                                            of type flow_id
  $N$, $N'$, $N''$, bin, bin_ind, row, $Q'row$, $L$, parity                           of type integer
  out_msg, $Q'msg$                                                                    of type message
  range[1..#flows], credit[1..#flows], index[1..F], total[1..#flows]                  of type array of integers
  LeftMost[1..m], space[1..m], active[1..m] of type circular array of integers {see [AHUa] page 58}
  sorter[0..1][1..#flows][0..1]             of type array of bins, each bin of length $BS$
  $Q'_{bin}[1..F]$              of type array of bin queues, length of queue $Q'_{bin}[i]$ is Envelope[i] bins

--- procedure Store_Message (in_msg:message)
  {Performed upon receiving in_msg of flow fid}
  fid := in_msg.flow
  $L$ := in_msg.length
  if (total[fid] = 0)      {Non backlogged flow}
    then Handle_new_flow_DRR(fid) fi
  total[fid] := total[fid] + 1
  if Was_Serviced(fid)
    then row := range[fid]
    else row := range[fid] − 1 fi
  if ($L$ > credit[fid]) then
    {Flow fid is mapped to round range[fid] + 1}
    credit[fid] := credit[fid] + Quantum
    range[fid] := range[fid] + 1 fi
  if (row ≤ 1) then
    Insert_Sorter_DRR
                (in_msg, row, fid, out_bin)
  else                                    {row > 1}
    $Q'row$ := row − 1
    Monotone_Handle($Q'row$)
    if ($L$ > space[$Q'row$])
      then Start_New_Bin($Q'row$) fi
    space[$Q'row$] := space[$Q'row$] − $L$
    credit[fid] := credit[fid] − $L$
    enqueue (in_msg, $Q'_{bin}$[LeftMost[range[fid]]])
  fi
end of procedure Store_Message procedure Fetch_Data ()
  do (Forever)    { begin new round }
    $N$ := dequeue (LeftMost)
    {$N$ := LeftMost[1] and shift down LeftMo.
    enqueue (1, LeftMost)
    $N'$ := dequeue (space)
    {$N'$ is never used, just advance array space}
    enqueue ($BS$, space) {space[m] := $BS$}
    $N''$ := dequeue (active)
    {$N''$ is never used just advance array active}
    enqueue (0, active)   {active[m] := 0}
    Not_Serviced_All()
    parity := 1 − parity
    do in parallel
      Transmitter_DRR ()
                      {transmitter scheduler}
      Order ($N$)       {order scheduler}
    od         {Both schedulers are done}
  od                        {end of round }
end of procedure Fetch_Data

Fig. 7

```
procedure Monotone_Handle (r:integer)
  active[r] := active[r] + 1
  if ((r > 1) and (active[r] = LeftMost[r − 1]))
    then Start_New_Bin(r − 1) fi
end of procedure Monotone_Handle procedure Start_New_Bin(r:integer)
  {Close open bin in range r and open new one}
  enqueue (dummy, Q'_bin[LeftMost[r]])
                              {Close current bin}
  LeftMost[r] := LeftMost[r] + 1
                              {Open a new bin}
  if (LeftMost[r] > F) then OVERFLOW fi space[r] := BS              {Bin Size}
end of procedure Start_New_Bin procedure Insert_Sorter (msg:message,
        row:integer, fid:flow_id, bin_type:integer)
  if (parity = 0)
    then enqueue
              (msg, sorter[row][fid][bin_type])
    else enqueue
              (msg, sorter[1 − row][fid][bin_type]) fi
end of procedure Insert_Sorter procedure Handle_new_flow_DRR (fid:flow_id)
  credit[fid] := Quantum
  range[fid] := 1
  Set_Serviced(fid)
end of procedure Handle_new_flow_DRR procedure Insert_Sorter_DRR
        (msg:message, row:integer, fid:flow_id,
                                bin_type:integer)
  Insert_Sorter (msg, row, fid, bin_type)
end of procedure Insert_Sorter_DRR
```

```
procedure order (N:integer)
  bin := 1
  bin_ind := 1
  while (bin > 0) do
    msg := dequeue (Q'_bin[bin])
    if (msg = dummy) then
      if (index is empty)
        then bin := 0
        else bin := dequeue (index) fi
      else Insert_Sorter_DRR
                (msg, 1, msg.fid, in_bin) fi
    if (bin_ind < N) then
      (bin_ind := bin_ind + 1)

fi
  od
end of procedure order procedure transmitter_DRR()
  ref := Next_Fetched_Queue()
  while (ref > 0) do
    Set_Serviced(ref)
    range[ref] := range[ref] − 1
    Serve_DRR(ref, in_bin)
    Serve_DRR(ref, out_bin)
    ref := Next_Fetched_Queue() od
end of procedure transmitter_DRR procedure Serve_DRR
            (ref:flow_id, bin_type:integer)
  while (sorter[parity][ref][bin_type]
                            is not empty) do
    out_msg := dequeue
              (sorter[parity][ref][bin_type])
    transmit (out_msg)
    total[ref] := total[ref] − 1 od
end of procedure Serve_DRR
```

Fig. 7 (Cont)

Additional Variables
$Send[1..\#flows]$, $Last\_Send[1..\#flows]$
  of type array of integers
$Time$, $Start\_Time$ of type integer

--- procedure Handle_new_flow_WFQ
                              (fid:flow_id)
$credit[fid] :=$
    $(Quantum \cdot (1 + \lfloor \frac{Time}{Quantum} \rfloor)) - Time$
$range[fid] := 0$
$Send[fid] := Time + L$
{Recall that $L$ is the length of the message}
Set_Serviced(fid)
end of procedure Handle_new_flow_WFQ procedure Insert_Sorter_WFQ
    (msg:message, row:integer, fid:flow_id,
                              bin_type:integer)
if $((bin\_type = in\_bin)$ and
   $(row = 1)$ and
   $(sorter[parity][fid][in\_bin]$ is empty) and
   $(sorter[parity][fid][out\_bin]$ is empty) and
   $(sorter[1 - parity][fid][in\_bin]$ is empty))
then $Send[fid] :=$
        $Last\_Send[fid] + msg.length$ fi
Insert_Sorter (msg, row, fid, bin_type)
end of procedure Insert_Sorter_WFQ

--- procedure transmitter_WFQ()
  $Start\_Time := Time$
  $ref := extract\_min[Send[\cdot]]$
  $Time := Send[ref]$
  while $(\lfloor \frac{Start\_Time}{Quantum} \rfloor = \lfloor \frac{Time}{Quantum} \rfloor)$ do
    if not (Was_Serviced(fid))
    then
       Set_Serviced(ref)
       $range[ref] := range[ref] - 1$ fi
    if $(sorter[parity][ref][in\_bin]$ not empty)
    then $out\_msg :=$
           dequeue $(sorter[parity][ref][in\_bin])$
    else $out\_msg :=$
         dequeue $(sorter[parity][ref][out\_bin])$ fi
    transmit $(out\_msg)$
    $total[ref] := total[ref] - 1$
    $Last\_Send[fid] := Time$
    if $(sorter[parity][ref][in\_bin]$ not empty)
    then $Send[ref] := Time+$
      $(head(sorter[parity][ref][in\_bin])).length$
    else if
        $(sorter[parity][ref][out\_bin]$ not empty)
      then $Send[ref] := Time+$
      $(head(sorter[parity][ref][out\_bin])).length$
      else if
        $(sorter[1 - parity][ref][in\_bin]$ not empty)
        then $Send[ref] := Time+$
      $(head(sorter[1 - parity][ref][in\_bin])).length$
        else if
          $(sorter[1 - parity][ref][out\_bin]$ not empty)
          then $Send[ref] := Time+$
      $(head(sorter[1 - parity][ref][out\_bin])).length$
          else $Send[ref] := \infty$
          fi
    $ref := extract\_min[Send[\cdot]]$
    $Time := Send[ref]$
  od
end of procedure transmitter_WFQ

Fig. 8

SPACE EFFICIENT FAIR QUEUING BY STOCHASTIC MEMORY MULTIPLEXING

FIELD AND BACKGROUND OF THE INVENTION

The present invention relates to the transmission of messages on a digital network and, more particularly, to a method of multiplexing buffer space between the messages of backlogged flows at the output port of a switch.

The present invention addresses the problem of sharing buffer space between backlogged flows that pass through a link. Since the traffic of the flows may be bursty, the link is occasionally congested, and backlogged messages are queued up. The standard approach of storing the backlogged messages in a single queue is problematic, as it might lead to unfairness between the flows and jitter amplification within a flow. A common approach to resolve these problems is to maintain a queue for each flow and serve the queues in a Round-Robin manner. See, for example, John Nagle, "On packet switches with infinite storage", *IEEE/ACM Transactions on Communication,* 35(4): 435–438, April 1987 and S. Keshav, "A control-theoretic approach to flow control", in *Proc. SIGCOMM, pp.* 3–16, September 1991. This solves the fairness and jitter problems, but introduces a new problem, that of memory management.

Two basic approaches for this memory management are common, a static approach and a dynamic approach. In the static approach a queue is dedicated to each active flow while in the dynamic approach a linked-list is assigned to each flow. The former is inefficient in the usage of space but better suited for hardware implementation, while the latter is optimal in the usage of space but requires sophisticated hardware.

There is thus a widely recognized need for, and it would be highly advantageous to have, a method of memory management in flow control that combines the spatial efficiency of the dynamic approach with the relatively simple hardware of the static approach.

SUMMARY OF THE INVENTION

According to the present invention there is provided A method for allocating space in a memory for storing messages of equal length to be transmitted via an output port of a link, and then transmitting the messages, each of the messages being associated with a flow having a flow index, the flow indices being in a certain order, the method including the steps of:

(a) dividing the memory among a plurality of queues, each of the queues having at least one location, each of the locations being at least as long as one of the messages, at least one of the queues having a maximum number of the locations, and at least one of the queues having a number of the locations less than the maximum number of the locations, each of the locations in one of the queues having an ordinal index within the queue;

(b) storing each of the messages in one of the queues so that each message of a flow is stored in a location having a different ordinal index than any other location used to store any other message of the flow; and (c) for each of the queues in which at least one message is stored, transmitting the message that is stored in the location that has a lowest ordinal index.

According to the present invention there is provided A method for allocating space in a memory for storing messages to be transmitted via an output port of a link, and then transmitting the messages, each message having a certain length bounded above by a maximum message length, each message being associated with a flow having a flow index, the flow indices being in a certain order, the method including the steps of:

(a) dividing the memory among a plurality of queues, each of the queues having a queue index, each of the queues having at least one bin, at least one of the queues having a maximum number of the bins, and at least one of the queues having a number of the bins less than the maximum number of the bins, each of the bins having an ordinal index within the queue;

(b) for each message, computing a transmission round in which the message is to be transmitted;

(c) for each message, storing the message in at least one of the bins whose ordinal indices are related to the transmission round, so that, for the queues of the at least one of the bins whose ordinal indices are related to an earlier transmission round and in which at least a part of at least one of the messages to be transmitted in the earlier transmission round is stored, a largest of the queue indices is at least as great as a largest of the queue indices of the queues of the at least one of the bins whose ordinal indices are related to a later transmission round and in which at least a part of at least one of the messages to be transmitted in the later transmission round is stored; and (d) for each of the queues in which at least part of one of the messages is stored in the bin having a lowest ordinal index, retrieving the at least part of the one of the messages for transmission.

The present invention is a new approach, called Stochastic Memory Multiplexing (SMM), for multiplexing the buffer space between flows. The approach is both simple to implement and efficient in space utilization. The hardware requirements of the present invention are close to those of the static approach, where the main building blocks are FIFO queues, and requiring only the addition of a few variables per flow. On the other hand, as shown by simulations and analysis, its space complexity is very efficient.

The abstract idea of the scheme is rather simple: Maintain queues of different sizes, many short ones, some medium size and a few long ones. Allocate an arriving message of a backlogged flow to a queue whose length is the same as the number of backlogged messages in that flow. Thus, messages of a flow may be stored in different queues as long as the i-th backlogged message of a flow is stored in the i-th location of some queue. In this way the number of long queues that must be maintained is the maximum number of flows that have a long burst simultaneously. Since, at any time, most flows have only a few backlogged messages and only a few flows are severely backlogged, the present invention multiplexes buffer space and efficiently shares it between flows, according to their needs.

Another way to view the scheme is as a single chain of varying size buckets of messages. The size of each bucket is fixed, but buckets at the head of the chain are larger than those farther back. In each round the messages from the first bucket, the one at the head of the chain, are serviced (transmitted) and the messages of each other bucket are shifted one bucket forward. In each bucket a given flow may store at most one message and only if it has a message in each of the buckets that precede it. This is why the space allocation for buckets decreases down the chain. (The k-th bucket has one message from each flow which has at least k backlogged messages.)

Previous Work

Storing the messages of all the flows that pass through an output port in a single queue is a source for several problems such as, unfairness and jitter amplification. Furthermore, some of the known flow control mechanisms (Keshav, 1991; H. T. Kung and R. Morris, "Credit-based flow control for ATM networks". *IEEE Networks,* 9(2): 40–48, March/April 1995; R. Jain, "Congestion control and traffic management in ATM networks: recent advances and a survey", *Computer Networks and ISDN Systems,* February 1995) require the assignment of a queue to each active flow in order to ensure proper operation.

Nagle (1987) proposed a scheme in which each flow has a dedicated queue, and the queues are serviced in a Round-Robin order. When messages are of fixed size (e.g., ATM cells) this method achieves not only local fairness in the allocation of link bandwidth, but also global max-min fairness, if used in all the switches in the network (Keshav, 1991).

The method of McKenney (P. McKenney, "Stochastic fairness queuing", *Internetworking: Research and Experience,* 2: 113–131, January 1991, which is incorporated by reference for all purposes as if fully set forth herein) improves on Nagle's by sharing queues between the flows. Based on the observation that the number of concurrently backlogged flows at any point of time is much smaller than the total number of flows McKenney employs statistical multiplexing to share a pool of queues among the flows. An idle flow that becomes backlogged randomly selects a queue, using a hash function on its flow id., and the flow id. is inserted at the end of a cyclic list of backlogged flows. The flows are serviced in the order that they appear in the cyclic list. Each id. is taken from the cyclic list, its queue is identified by the hash function, and if after transmitting a message out of the queue the flow is still backlogged then the id. is returned to the end of the cyclic list. McKenney's scheme is based on the existence of a simple hash function that, on the one hand, is easy to compute in O(1) time complexity, and, on the other hand, keeps the probability of assigning two concurrently backlogged flows to the same queue small enough. If, however, two flows are assigned to the same queue, they will have to share that queue, thus suffering from service degradation, i.e., unfair treatment. Hence the name of the scheme: Stochastic Fair Queuing (SFQ).

The queues that are used in McKenney's SFQ scheme may be implemented by a linked list, or by fixed (hardware) queues. The former is called "dynamic" SFQ, and the latter, "static" SFQ. In the dynamic scheme, when there are no free buffers to store a new message, the message at the end of the longest queue is dropped. This buffer stealing scheme can be done in O(1) time as well.

Notice that the usage of a cyclic list of active flows in McKenney's SFQ scheme avoids the complex operation of scanning all the queues to find the next non-empty queue as done in fixed Round-Robin service. Each flow now enters a new location in the order of transmission when it becomes backlogged and keeps its place in the order as long as it is backlogged. Further notice that in this scheme an arriving message of an idle flow is serviced in the next round (because its id. is placed in the end of the cyclic list).

Both Nagle's and McKenney's schemes assume that messages size is fixed, otherwise their fairness may be skewed. Demers, Keshav and Shenker (A. Demers, S. Keshav and S. Shenker, "Analysis and simulation of a fair queuing algorithm", in *Proc. SIGCOMM,* pp. 1–12, September 1989, which is incorporated by reference for all purposes as if fully set forth herein) extend the Round-Robin scheme to fairly service queues with variable size messages. Their scheme, called Weighted Fair Queuing (WFQ), performs the Round-Robin based on the message size, such that each flow roughly transmits the same number of bits. Their implementation requires an O(log n) time complexity per operation, where n is the number of current backlogged flows. Shreedhar and Varghese (M. Shreedhar and G. Varghese, "Efficient fair queuing using deficit round robin", *IEEE/ACM Transactions on Networking,* 4(3): 375–385, June 1996, which is incorporated by reference for all purposes as if fully set forth herein) present a Deficit Round-Robin scheme that reduces the time complexity of WFQ to a constant per operation, while maintaining most of the properties of WFQ. Both approaches can be implemented using either a static implementation of queues or a dynamic (linked list) implementation.

Model and Configuration

The following configuration is assumed herein: A data-structure, denoted Q, is used in each output port of a communication switch to store the messages of backlogged sessions that pass through this output port. Data structure Q supports two operations, insert(f,msg)} and remove. The insert(f,msg)} operation adds message msg of flow f that has arrived on one of the input ports of the switch, into Q. The remove operation removes a message from Q, and returns it (usually, in order to be transmitted). Specifying the behavior (fairness conditions) of Q amounts to placing restrictions and limitations on the sequence of messages returned by different sequences of operations on Q. For example, one such requirement is that if operation remove is repeatedly invoked again and again, then no message is stuck inside Q indefinitely. Another typical requirement is that messages of a particular flow are removed from Q in the same order that they have been inserted.

To specify the ideal behavior of Q, a particular implementation is described, called $Q^{ideal}$: an array of n queues $[q_1, q_2, \ldots q_n]$, one for each of the flows that may contend on the output port, as illustrated in FIG. 1A for the case of n=8. Each message in FIG. 1A is labeled by its flow (A through H) and by its sequence number (starting from 1). In the insert(f,msg) operation, message msg is simply enqueued in the queue associated with flow f. Messages are removed in a Round-Robin that goes in a fixed cyclic order over the queues, sending a message from each queue that is not empty. In this theoretical implementation each queue is of length m, large enough so it never overflows.

The Basic Idea

The key idea of SMM is based on the following observation: At any point of time, there are very few queues in $Q^{ideal}$ at that are full, and most of the queues are either empty or close to being empty, when $Q^{ideal}$ operates in a real network.

The intuitive idea of SMM is to left-justify all the messages in $Q^{ideal}$ at each point of time, as shown in FIG. 1B, thus making the first (the leftmost FIG. 1B) queue the longest, the second queue the second longest, etc. By left-justifying is meant taking all the messages that are in location i in any of the queues and placing them in location i of the first $L_i$ queues, where $L_i$ is the number of queues in $Q^{ideal}$ whose length is i or more. Each queue now contains messages from different flows. The new array of queues resulting from this operation is denoted Q'. Note that each row has the same set of elements in both $Q^{ideal}$ and $Q'$, and that a flow has a message in row j only if it has a message in row j−1.

Note that according to this scheme, the queues of $Q'$ are ordered (from left to right in FIG. 1) and are indexed by a queue index, typically starting from 1 at the left-most queue.

The remaining question is whether such a $Q'$ can be efficiently and directly implemented without the reference copy of $Q^{ideal}$. Herein are described various efficient and simple implementations of operations insert(f,msg) and remove that maintain a set of hardware or software queues that are as in $Q'$. The final implementation, "Individual Round Robin" (IRR), achieves this goal and is shown to behave exactly as McKenney's scheme. That is, for a given sequence of insert(f,msg) and remove operations, on our data structure, one cannot tell whether the IRR/SMM implementation of the present invention is used inside, or McKenney's SFQ implementation.

However, before addressing these questions, the amount of space really saved by the new method is analyzed. The amount of space saved by SMM is analyzed and compared to the amount of space used by McKenney's SFQ method and by $Q^{ideal}$.

For the sake of completeness a precise description of an abstract implementation of SMM called "Bulk Permutation Round Robin" or Bulk-PRR is first presented. A variable called length[f] is maintained that records, at any point of time, the number of backlogged messages of flow f plus one (initially set to one). In the insert(f,msg) operation, message msg is enqueued in the left-most queue of $Q'$ whose length[f] location is vacant. Following the "monotonous property", stated and proved below, this enqueue operation places message msg exactly in location length[f] of that queue. A variable LeftMost[j] is used to track the left-most queue whose j'th location is vacant, j being the ordinal index of locations in the queues. At the end of the operation both LeftMost[length[f]] and length[f] are incremented by 1 (in that order). The sequence of remove operations is partitioned into rounds. In the beginning of each round all the messages in the first location of each of the queues are taken out of the array in one atomic multi-dequeue operation and are placed in a special transmitting buffer. At the same time, length[f] for each of the dequeued flows is decremented by one, and the array LeftMost[.] is shifted down one location, inserting 1 in the new upper location. Each remove operation takes a message from the transmitting buffer, in sequence, until the buffer is empty, at which time a new round starts.

Observation: Monotonous Property At any point in time in the implementation of the abstract SMM, LeftMost[j] $\geq$ LeftMost[j+1] for j=1, . . . m−1, where m is the length of the longest queue in $Q'$.

Proof: Follows by induction from the fact that a message of a flow is placed in location j>1 only if this flow has a message in each of locations 1 to j−1.

A critical design decision for SMM is the structure of $Q'$. This design issue is similar to setting the queue size for a flow to a certain size or allocating a certain size of shared memory. In this section a few variations are analyzed to show the benefit of using $Q'$, namely how a low loss probability can be achieved with a significant saving in memory.

Clearly the number of queues in $Q'$ should be F, the maximum number of flows that we allow to be simultaneously blocked. Fixing the lengths of the queues is trickier. The length of the first queue should be at least the length of the longest queue at any point of time in $Q^{ideal}$, given that the loss probability is zero. Similarly, the length of the second queue should be the maximum length of the second longest queue at any point in time, and so forth. Starting from these queues lengths, the shorter we make the queues the higher the probability of loss.

Definition: Envelope: the vector Envelope[1. . . F] of the queue lengths in $Q'$.

Definition: Envelope Size: For a given envelope, its size=

$$\sum_{i=1}^{F}$$

Envelope[i]
This is the amount of space required by the corresponding $Q'$.

E.g., the envelope of $Q'$ in FIG. 1B is (7, 6, 3, 2, 1, 1, 1, 1) and its size is 22.

Two questions are now addressed:

1. For a given 0<ε<1 what is the smallest envelope size that ensures loss probability no more than ε.

2. Given a certain buffer allocation policy (e.g., McKenney, or link list based SFQ) with space M, what is the smallest SMM envelope size that ensures the same loss probability (on any traffic pattern).

Clearly, the answers to these questions depend on the characteristics of the traffic passing through the link. FIG. 2 shows the SMM envelopes required to accommodate the backlogs of 16 active flows with Poisson traffic sources, simulated using BoNES (ALTAGROUP Bones designer core library reference, Technical Report, December 1994), at four different loss probabilities. Each flow comes from an identical and independent source. In a transmit state, each source sends messages according to a Poisson distribution with exponent $\lambda$=(LinkRate)/(8+$\delta$), with $\delta$ set to be 0.01. In an idle state, each source sends no messages. The average length of either a transmit period or an idle period is 20 message time units. The following table compares the amount of space (number of locations) required by the static scheme, SMM, and the dynamic SFQ linked list based scheme to accommodate these backlogs at the loss probabilities considered:

| Loss Probability | Static Scheme | SMM | Linked List |
| --- | --- | --- | --- |
| .05 | 1216 | 837 | 789 |
| .01 | 1888 | 1141 | 1039 |
| .001 | 2960 | 1466 | 1341 |
| .00001 | 4304 | 1703 | 1418 |

As can be seen, the amount of space required by SMM is significantly smaller than that required by static scheme and is slightly larger than that required by the dynamic (link list based) scheme. For example, for loss probability 0.00001 the envelope is (274,189,169,152,134,118,101,96,88,78,71, 63,55,48,35,32), adding up to a total of 1703, while in the static scheme the length of each of the queues is 269, requiring a total space of 4304 messages.

The traffic patterns in FIG. 2 are not very bursty, (average burst is small, 2.5 messages in an interval of 20 message time units). Hence, the slope of the diagrams in the figure is rather shallow. If there were more flows, with different parameters (e.g., longer and larger bursts or different flows that come from different distributions) the advantage of the scheme of the present invention over the static scheme might be even more significant. This is because the scheme of the present invention takes advantage of statistical multiplexing, a benefit that increases as the variance in the behavior of the flows increases.

Proceeding to the second question above, it is next shown that:

Theorem: The loss probability of M ln F space SMM is smaller than or equal to that of McKenney's linked list based SFQ scheme with space M (or to that of static SFQ with space MF).

A formal statement and proof of the theorem is given in Appendix A below. An outline of the proof is as follows: Consider SMM with an envelope obtained by dividing M successively by consecutive integral queue indices starting from 1, i.e., M, [M/2], [M/3], . . . [M/F], where the brackets represent truncation to an integer. Clearly, the largest possible queue in both SMM and the M space SFQ is M, the second largest queue possible in both is M/2 etc. Hence, at any point of time the M messages that the SFQ holds, are also held by this M ln F SMM scheme.

The present invention is applicable beyond the primary application of digital communications. Indeed, it may be used in applications in general in which the Round Robin concept applies, for example, in multi-process operating systems in which clients access a server in Round Robin order. Although the present invention is described herein in terms of the transmission of messages on a digital network, it will be clear to those skilled in the art how to adapt the present invention to other Round Robin applications.

BRIEF DESCRIPTION OF THE DRAWINGS

The invention is herein described, by way of example only, with reference to the accompanying drawings, wherein:

FIG. 3 shows pseudo-code for one implementation of "individual remove" for fixed-length messages;

FIG. 5 shows pseudo-code for "individual Round Robin" for fixed-length messages;

FIG. 7 shows pseudo-code for "Individual Round Robin" for messages of variable length;

FIG. 8 shows, in pseudo-code, how the code of FIG. 7 must be modified for Weighted Fair Queuing.

DESCRIPTION OF THE PREFERRED EMBODIMENTS

Figure 1A:
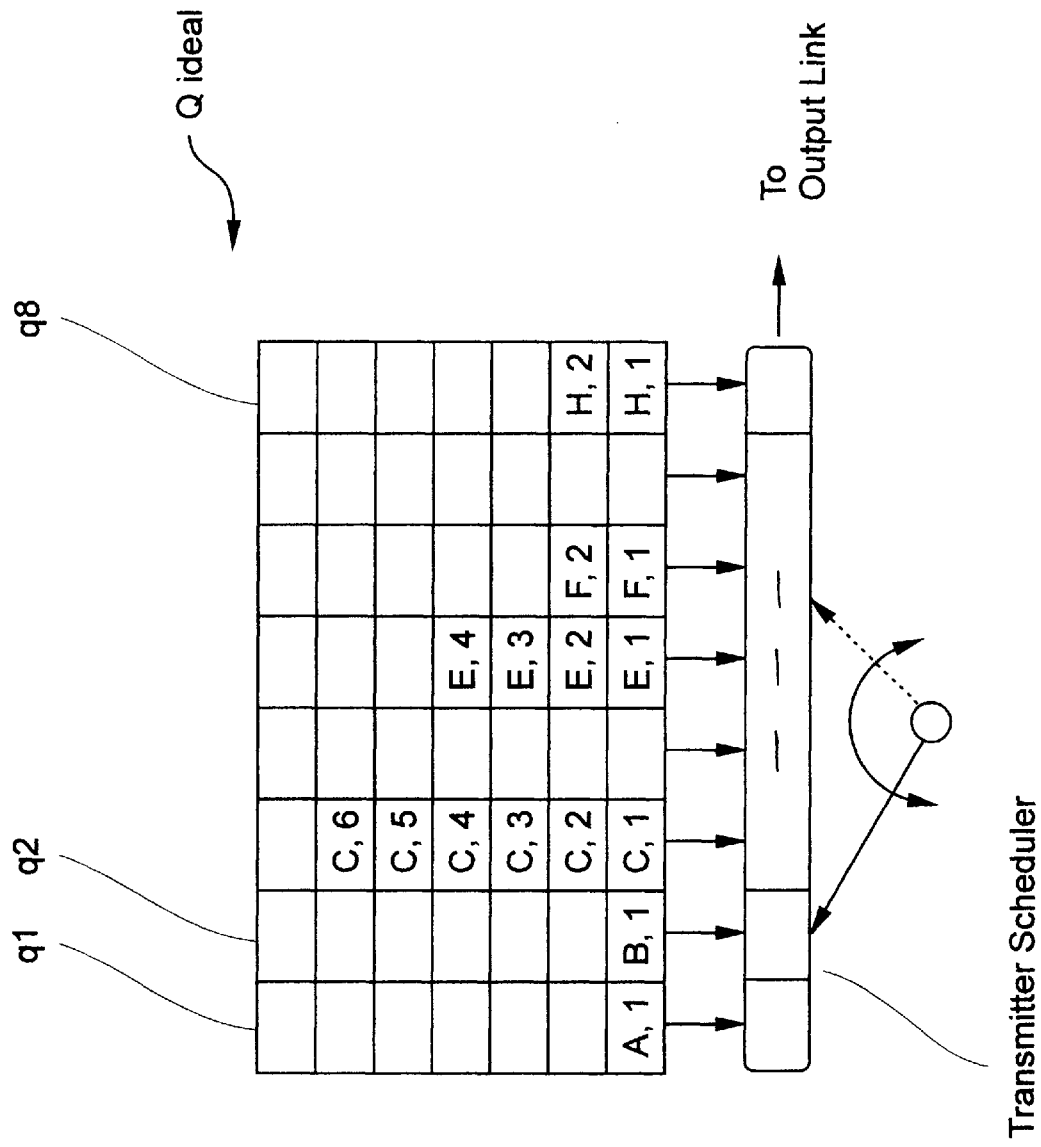
FIG. 1A shows an example of an ideal data structure.
Figure 1B:
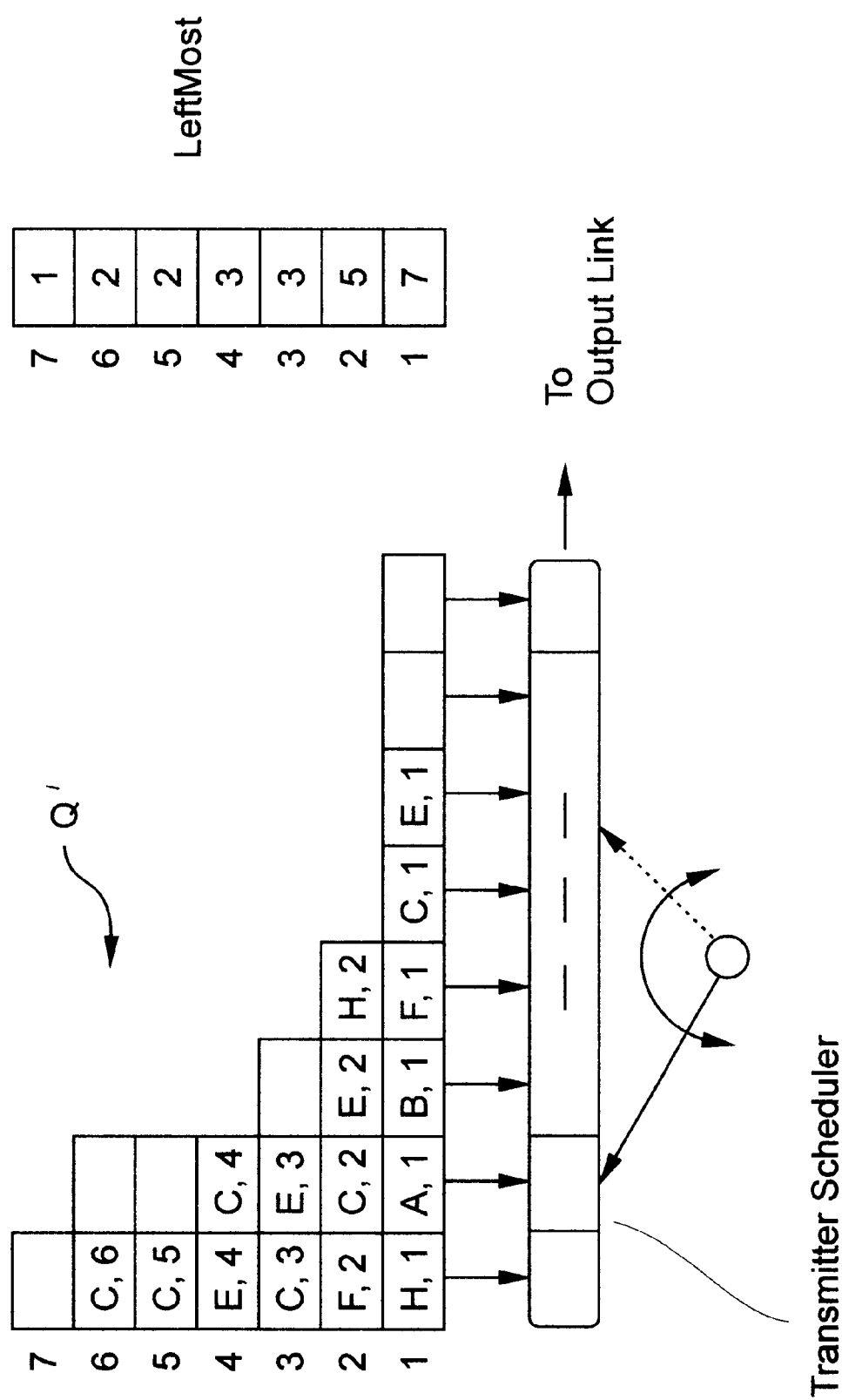
FIG. 1B shows an example of a data structure according to the present invention.
Figure 2:
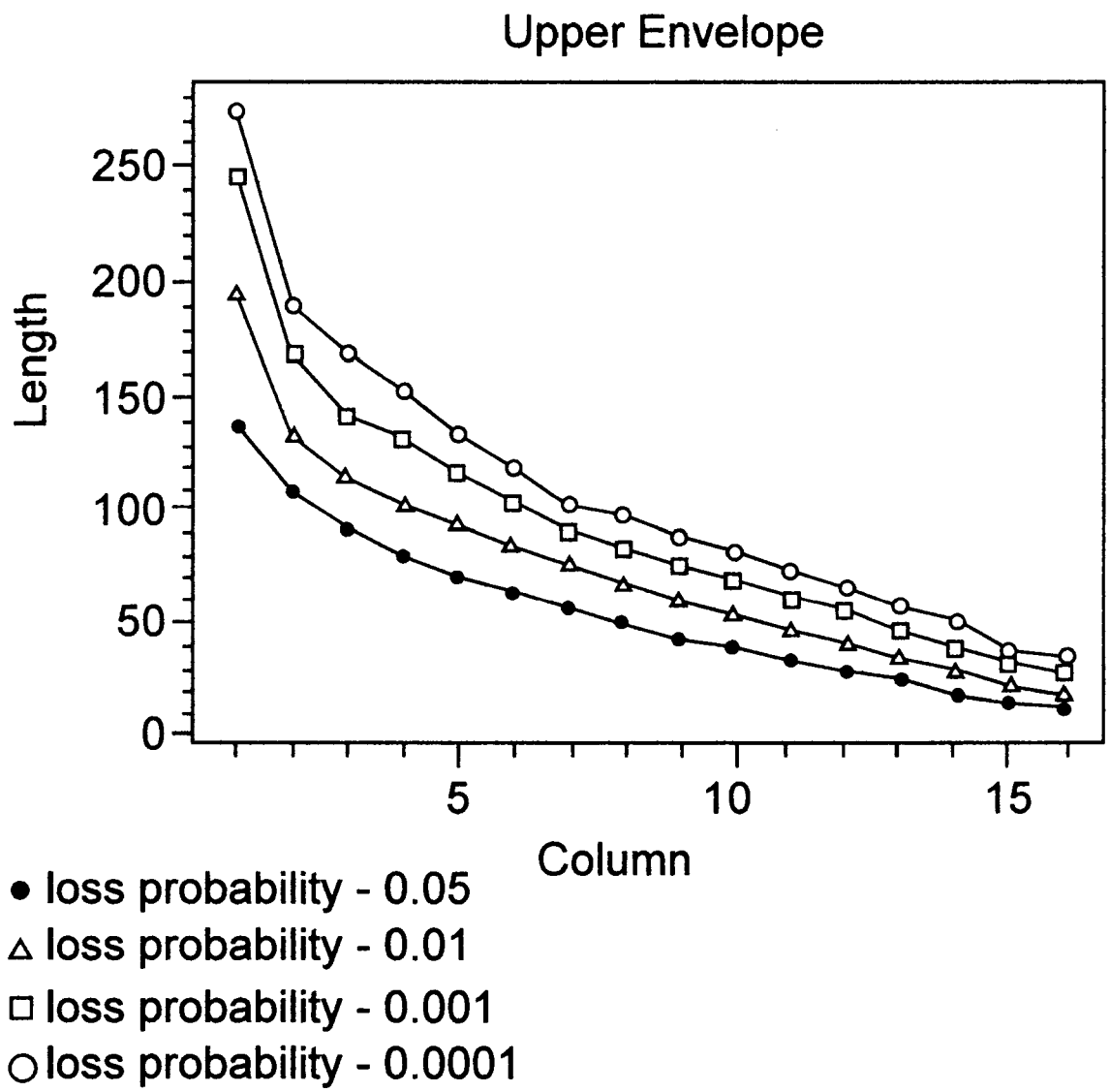
FIG. 2 shows plots of queue envelopes required to accommodate backlogs of 16 simulated flows according to the present invention.

The present invention is of a method of memory multiplexing which can be used to efficiently store the messages of backlogged flows at the output port of a switch.

The principles and operation of memory multiplexing according to the present invention may be better understood with reference to the drawings and the accompanying description.

Fixed-Size Messages: Implementation

Herein are presented, first, a sequence of three simple implementations of SMM, under the assumption that messages size are fixed, and then, implementations for messages of variable size.

1. Bulk Permutation Round-Robin SMM scheme (Bulk-PRR), as described above. Here it is shown that this scheme closely mimics an ideal implementation such as McKenney's SFQ method. That is, each round of the Bulk-PRR scheme is a permutation of the corresponding round in the SFQ scheme.

2. Individual remove: Permutation Round-Robin, that relaxes the assumption that an atomic multi-dequeue operation exists, but preserves the behavior of the abstract scheme.

3. Individual Round-Robin (IRR)}, a simple implementation building on the previous two, that behaves exactly as McKenney's SFQ method.

Bulk Round-Robin Implementation

Here it is asserted that on the same traffic and as long as there are no message losses, the set of messages sent in each round in the abstract implementation is the same as in McKenney's SFQ scheme. However, while in the SFQ implementation the messages of backlogged flows are removed in each round according to the same permutation, in the abstract implementation backlogged flows may be permuted differently in each round. Hence the name "Permutation Round Robin".

The assertion follows by induction by observing that for both schemes the set of messages transmitted in a round is fixed at the beginning of the round and, messages of non-backlogged flows, that arrive during a round, are transmitted only in the following round.

This assertion can be stated differently as follows: Assume that a particular message msg is transmitted at time t, in round r (time is measured in messages transmission time units), in a Bulk-PRR implementation, and that $\bar{F}$ messages are transmitted during that round. Then, message msg is transmitted in the SFQ implementation in the time interval $[t-\bar{F}+1, \ldots t+\bar{F}-1]$.

Notice that the total number of messages of an arbitrary flow transmitted on an output link at any time t (from the beginning of the execution until t) in the two schemes differs by at most one.

Individual Remove: Permutation Round Robin

The idea of this implementation is very simple: remove messages out of the queues one by one, in order of increasing queue index. Each is dequeued from the corresponding queue in Q'. The insert operation is implemented as before.

This scheme works fine except for one particular case that needs some attention. The goal is to make sure that it perfectly mimics the Bulk-PRR scheme. At the beginning of each round N, the number of backlogged flows (=LeftMost [1]−1) is registered, and only that many queues are dequeued in this round. Thus, the set of messages serviced in each round is fixed at the beginning of the round, as in the Bulk-PRR scheme. The difference between the two schemes, as described thus far, is the time at which length[f] of a serviced flow f is decremented. In the Bulk-PRR, it is decremented at the beginning of the round, while in the individual remove at the time that this flow is serviced. Hence, if a message of a backlogged flow arrives during a round, and before this flow has been serviced in this round, then it is inserted into a different location then it would have been inserted to in the Bulk-PRR.

There are two possible ways to overcome this problem: One is more suitable for hardware implementations and the other for software implementations. The first is simply to associate a Boolean flag, serviced, with each backlogged flow that tells whether this flow has been serviced in the current round or not. Three functions are associated with this flag: Set_Serviced(fid) to simply set the flag of flow fid, Was_Serviced(fid) to test its value, and Not_Serviced_All() to reset all the flags at once. Now, when a message of a backlogged flow fid arrives and Was_Serviced(fid)=false, then the location into which this message is inserted is calculated using a decremented value of length[fid]. The function Not_Serviced_All() can be implemented in constant time either by hardware or by software (A. V. Aho, J. E. Hopcroft and J. D. Ullman, *The Design and Analysis of Computer Algorithms*, Addison-Wesley, 1974, page 71). The corresponding pseudo-code is shown in FIG. 3. "AHUa" refers to A. V. Aho, J. E. Hopcroft and J. D. Ullman, *Data Structures and Algorithms*, Addison-Wesley, January 1983.

The alternate software solution uses a Boolean variable called global_toggle, and a binary variable, toggle[f], for each backlogged flow f At the beginning of each round global_toggle is set to the parity of that round, (i.e. global_toggle:=not(global_toggle)), while the toggle[f] of each backlogged flow that has not yet been serviced remains at the parity of the previous round until it is serviced (when it is set equal to the global toggle), thus enabling the easy detection of backlogged flows that have not yet been serviced. Operation Set_Serviced(fid) is now implemented by setting toggle[fid] to equal global_toggle (i.e., toggle[fid]:=global_toggle), and operation Was_Serviced(fid) compares global_toggle to toggle[fid] (i.e., if (toggle[fid]=global_toggle) then return (True); else return (False)). The only way these two values can be not equal is if flow fid was backlogged at the beginning of the current round and has not yet been serviced in this round.

Individual Round-Robin (IRR)

The Individual remove scheme is modified as follows: Instead of removing messages in each round by dequeueing the queues one after the other from left to right, for each round a permutation vector is prepared that maps from each backlogged flow id., treated as an index from an ordered set of flow indices, to the queue holding the first message of that flow. Given such a permutation vector, it is now easy to remove messages according to a given order: Take the next flow id. in the order; find the queue whose first message is of this flow, by going through the permutation vector; and remove it by dequeueing that queue.

Preparing the permutation vector for each round turns out to be not much harder. Two such permutation vectors are maintained, one for the current round and one for the subsequent round. Each time a message is dequeued in this round, after it has been dequeued, the flow id. of the message that now moved to the head of the dequeued queue is observed. The permutation vector for the next round is appropriately updated in the index of this flow id. by that queue number. In addition, the permutation vector of the next round is appropriately updated whenever a message of a non-backlogged flow is enqueued. When a new round starts, the two permutation vectors are swapped.

Figure 4:
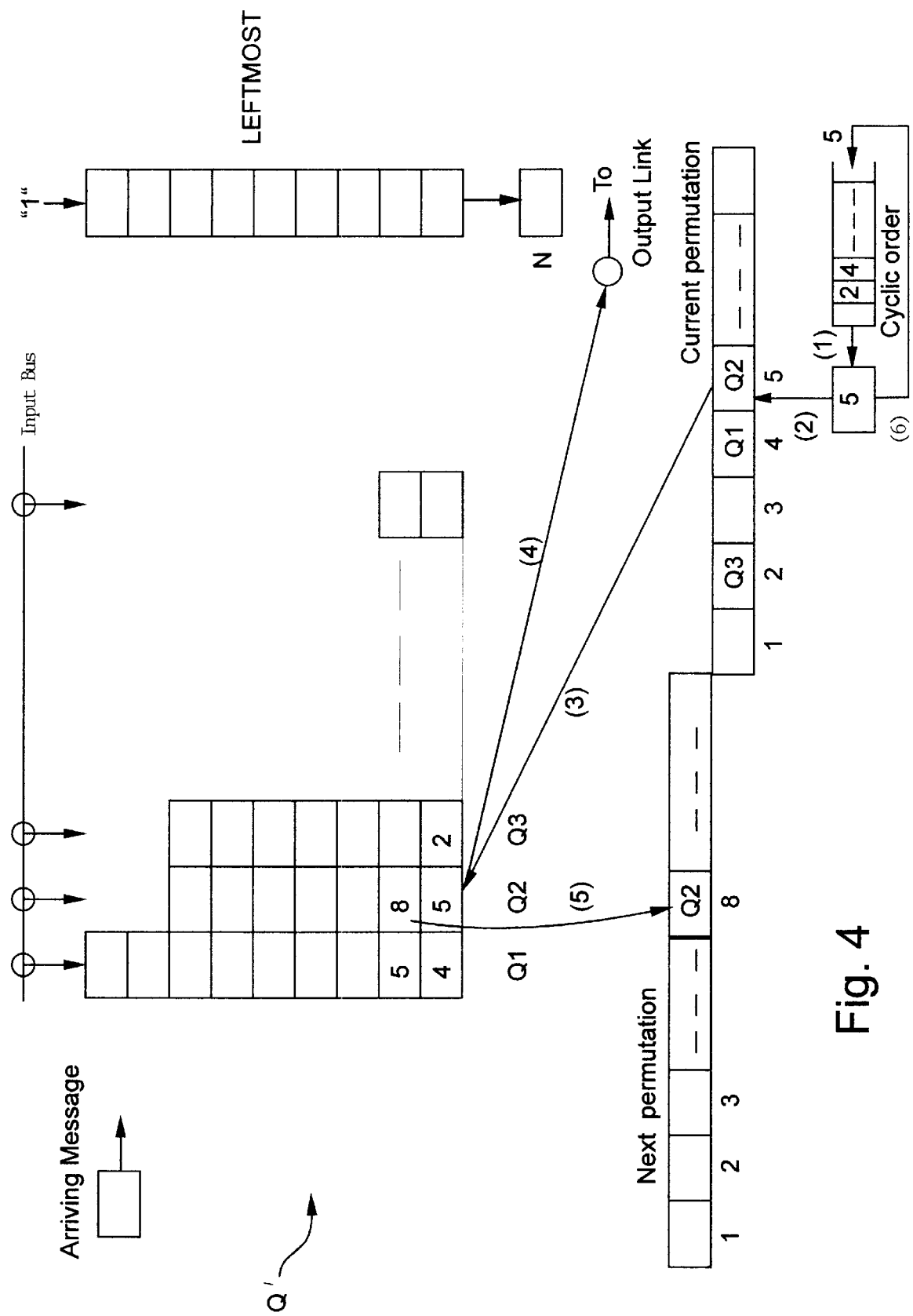
FIG. 4 illustrates "individual Round Robin" for fixed-length messages.

Individual Round-Robin is illustrated in FIG. 4. The messages stored in the bottom row of Q' are transmitted according to the cyclic order. In the first step, the flow to be serviced next (in this case, flow 5) is located according to the cyclic order. In the second step, the queue in which the target message is stored (Q2 in this case) is located according to the permutation of the current round. In the third step the message is dequeued and in the fourth step the message is transmitted on the output link. In addition, as another message (from flow 8 in this example) moves to the head of Q2 after the dequeueing of the message from flow 5, then in the fifth step the permutation vector of the next round is updated accordingly, so that the entry corresponding to flow 8 refers to queue Q2. If flow 5 remains backlogged after the current message is transmitted, then in step 6 the cyclic order is updated accordingly.

Maintaining the Round Robin order in which messages are removed is done as in McKenney's SFQ scheme, by using a cyclic list, and is simply implemented by a dedicated queue.

The pseudo code of the scheme is given in FIG. 5. In the code it is assumed that the permutation vectors are large enough, having a unique entry for each possible flow id. This assumption can be easily relaxed if a hash function is used, as in McKenney. That is, the size of each permutation vector may be linear in F (the expected maximum number of concurrently backlogged flows) while the time complexity required for each operation is still constant.

A SMM queuing system has thus been implemented that behaves exactly as the SFQ scheme of McKenney, but in its static implementation uses a considerably smaller space, as discussed above.

Variable Size Messages

When Round-Robin is applied on a per message basis in a system with different size messages, it may result in unfairness, as flows with large messages get more bandwidth at the expense of flows with small messages.

Demers, Keshav and Shenker (1989) introduced the Weighted Fair Queuing (WFQ) to resolve this fairness problem by applying Round-Robin at the bit level rather than at the message level. The implementation of Weighted Fair Queuing computes far each message the time at which the switch would have completed the transmission of the message, given that Round-Robin was used on a per bit transmission basis. The scheduler selects for transmission the message with the least completion time. This approach guarantees fairness and requires O(log F) computation time to perform a single operation, where F is the number of concurrently backlogged flows (the computation time is determined by the time it to takes the scheduler to find the message with the least completion time).

Shreedhar and Varghese (1996) present the Deficit Round-Robin (DRR) scheme that improves the computation time from O(log F) to a small constant. This is achieved while maintaining the fairness property (at a coarser granularity, which implies a slightly higher jitter).

Both WFQ and DRR approaches are coupled with a queuing infrastructure that may be implemented by either a linked list or by static queues.

Herein is presented an efficient implementation of both methods that follows the ideas presented above in the context of fixed-size messages. As in the case of the fixed size message schemes, the resulting new schemes maintain fairness, use F static queues of varying size and are thus likely to be more space efficient than the static scheme.

First, the behavior of DRR is studied. It is shown that the concept of DRR implies a division of the backlogged data into different rounds. Moreover, whenever a new incoming message is received, it can be stored according to the round in which it should be transmitted. This observation yields three possible scheduling schemes: "Variable Bulk Fetch", "Variable Individual Remove" and "Variable Round-Robin". The three schemes are analogous to the three schemes presented in connection with fixed-length messages: the Variable Round-Robin scheme transmits messages in full compatibility with DRR, while in the other two implementations the transmission schedule is slightly different than DRR, but of course the FIFO order between messages of the same flow is kept and fairness is nearly perfect. In all the three schemes the cost of each operation (i.e., when a message is received or transmitted) is a small constant.

Next, it is shown that the Variable Individual Round-Robin fetch can be extended to support other scheduling methods as well. In particular, this observation yields a space efficient implementation of WFQ where the cost of each operation (reception or transmission of a message) is O(log F).

Notice that the hardware necessary to implement the linked list method when messages are of variable size is an order of magnitude more complex than for fixed size messages. (This stems from the difficulties introduced by memory fragmentation.)

Efficient Implementation of Deficit Round Robin

The idea of Deficit Round-Robin is as follows: Time is divided into rounds. At the beginning of each round a fixed amount of credit, called Quantum, is deposited into the account of each backlogged flow. The units of credit are bits, reflecting the number of bits that a flow with that credit may transmit. The scheduler does a Round-Robin scan over the queues of all flows that are backlogged at the beginning of the round. From each such queue the scheduler transmits consecutive messages as long as the account balance associated with that flow is larger than or equal to the number of bits in these messages. If a flow is still backlogged after it has been serviced (i.e., the scheduler stops transmitting messages of that flow due to shortage in the account balance) then its account balance carries over to the next round. If, however, a flow is not backlogged after it has been serviced (i.e., the scheduler stops transmitting messages of that flow due to lack of backlogged messages) then its account balance is set to zero. In Shreedhar and Varghese (1996) it is shown that over a long period of time DRR guarantees fairness. The main advantage of DRR is that it requires only a small constant number of operations per message enqueueing or dequeueing, assuming Quantum≧Max_Message_Size, where Max_Message_Size denotes the maximum possible size of a message.

The first observation in applying the present invention to DRR is that the round at which a message will be transmitted can be computed in DRR when the message arrives.

The proof is by construction. For each backlogged flow i a variable range[i] is maintained that holds the round (relative to the current round) to whom the last message received for this flow is mapped. In addition for each backlogged flow i a variable credit[i] is maintained that holds the amount of additional bits that flow i may send in round range[i]. When a new message of length L arrives that belongs to a non-backlogged flow i, then range[i] is set to 1 (the new message is mapped to the next round) and credit[i] is set to be Quantum−L. When a new message of length L arrives that belongs to a backlogged flow i then there are two possibilities. If L is less than or equal to credit[i] then credit[i] is decreased by L as the new message is mapped to round range [i]. If L is larger than credit[i] then the new message should be mapped to round range[i]+1, so credit[i] is increased by Quantum−L and range[i] is increased by 1.

Assume each arriving message is labeled by the round at which it will be transmitted. At any time the labels of the messages in the queue of a certain flow in DRR constitute a continuous non-descending series of rounds. The messages of round j are followed by the messages of round j+1 and so forth. The abstract idea of the present implementation is to treat each such sequence as one unit, called bin, and to replace each fixed-size message, in the above discussion of fixed-size messages, by a bin. Thus the queue of each flow i is now a queue of bins, from bin 1 to bin range[i]. The array of queues of bins, $Q_{bin}$, is analogous to the array of queues of fixed-length messages, Q. Notice that within each bin FIFO order is maintained. Assume that each bin is of fixed size (an assumption that might be relaxed in some possible implementations later). Under this assumption, the size of a bin is exactly Quantum+Max_Msg_Size (which is the largest possible value of credit[.], as no more than Max_Msg_Size credits may be carried over between rounds). Note that according to this concept there are cases where the storing messages in a bin might stop before it is completely full.

Recall that in the above discussion of fixed-length messages array $Q^{ideal}$ was replaced with array Q'. Using the same concepts, $Q^{ideal}_{bin}$ (the array of bins which is analogous to $Q^{ideal}$) is replaced with $Q'_{bin}$ which is an array of bins analogous to Q'. The replacement is done as follows: The picture of array $Q^{ideal}_{bin}$ is similar to that of FIG. 1A, and it is composed of rows of bins. Whenever a message of flow i is mapped to round range[i] and is put in bin $Q^{ideal}_{bin}$[range[i],i], an attempt is made to place it in $Q'_{bin}$, in the left most bin in range[i] which is not marked full. If that bin does not have enough room for the new message, that bin is marked full and the filling up of the next bin in that row is started. Therefore, in $Q'_{bin}$ each bin may contain messages of different flows and of different sizes. Let LeftMost[j] denote the left most bin in row j that is not marked full. (As before, j is an ordinal index of the bins in each queue.) Hence, whenever a message of flow i would be placed in bin $Q^{ideal}_{bin}$[range[i],i], it is placed in bin $Q'_{bin}$[range[i], LeftMost[range[i]]].

Figure 6:
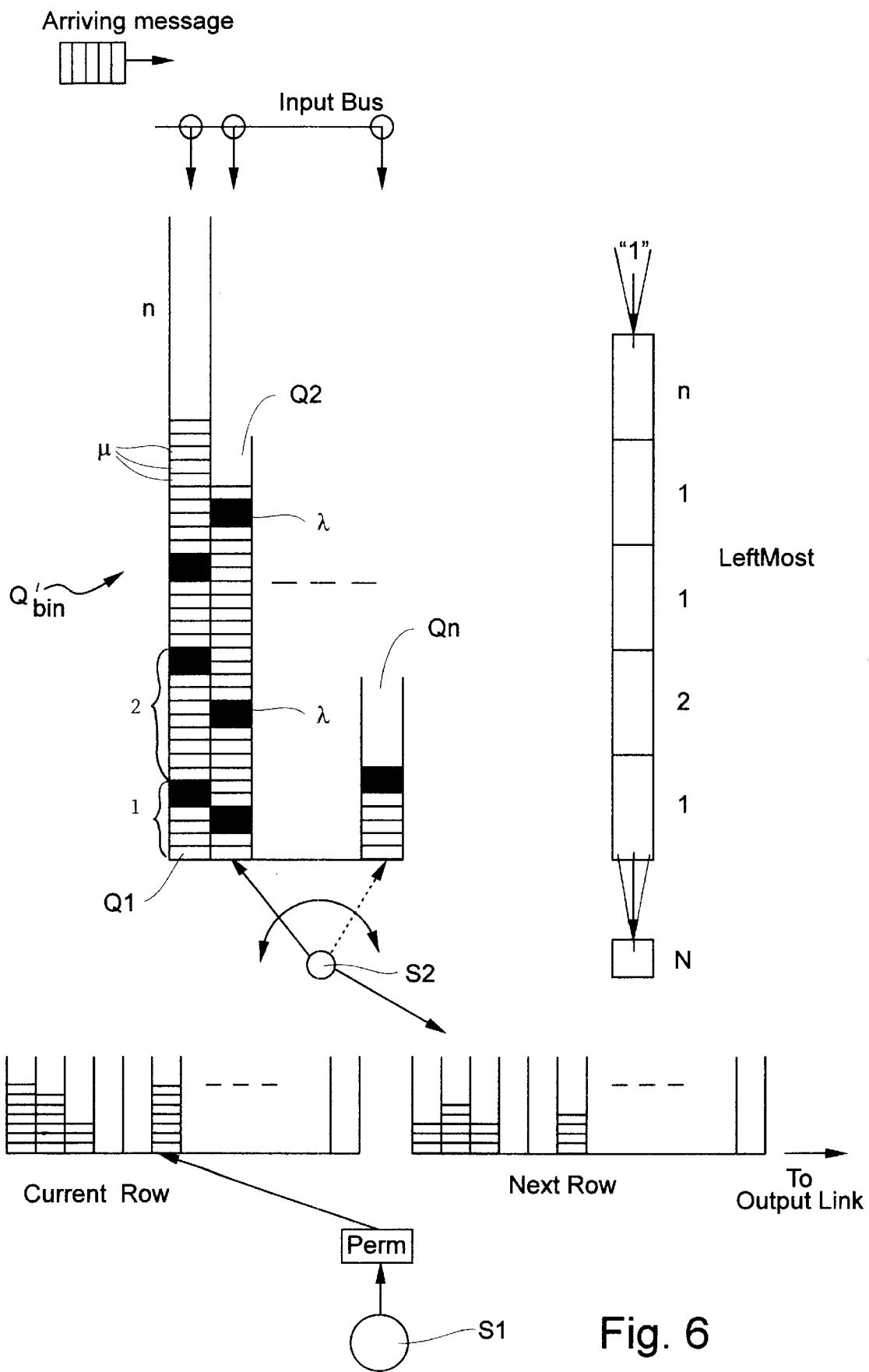
FIG. 6 illustrates the present invention as applied to messages of variable size.

Note that a bin is "closed" by marking it full rather than by filling it up to a fixed size. Hence, the number of bits that are stored in a "full" bin is not fixed, though it is restricted by the maximum possible size of the bin. To implement this concept, a special dummy element, that marks the end of a bin and the beginning of a new bin, is placed on the top of each "full" bin. Therefore, in a snapshot of $Q'_{bin}$, the beginnings and ends of bins that belong to the same row are not exactly aligned. In FIG. 6, which is described in more detail below, the first queue Q1, the second queue Q2 and the last queue Qn of $Q'_{bin}$ are shown with several bins, each containing several messages μ and terminated with dummy elements δ. The first and second bins of queue Q1 are labeled by reference numerals 1 and 2, respectively.

As in the above discussion of fixed-size messages, messages may be transmitted out of $Q'_{bin}$ in three different schemes that are the analogs of the fixed-size message bulk fetch, individual remove and individual Round-Robin schemes. The implementations look the same as these presented above except for some technical details.

The main difference is that now the monotonous property might be violated, as there is a possibility according to which the number of bins used in row j+1 is larger than the number of bins used in row j. This stems from two reasons:

1. The number of bits that a backlogged flow may store in a row can vary. When a flow is mapped to round j it has an initial credit that varies between Quantum and Quantum+Max_Message_Size (the addition to Quantum reflects an amount of credit that could not be used in the previous round). Hence, a flow is mapped to round j+1 when the number of bits in its messages in row j is somewhere between Quantum−Max_Message_Size and Quantum+Max_Message_Size (the variance is due to the variance in the amount of credit at the beginning of the round and due to the possible length of the message that causes the mapping to row j+1). Hence, the total amount of data in row j+1 might be larger than that in row j.

2. The amount of data stored in a blocked bin can vary between BS−Max_Message_Size and BS, where BS is the bin size (the variance is due to the possible length of the message that causes the closing of the bin).

Moreover, as there might be messages of different flows in the same bin, the analogous scheme of Individual Round-Robin cannot be implemented directly (as a message that is not at the bottom of a bin cannot be fetched).

There are three possible solutions to overcome these problems: (1) by implementing each column by a circular array (so that messages might be enqueued to other bins in the same column except for the upper bin); (2) by slightly increasing the maximum bin size to Quantum+2·Max_Message_Size while closing a bin in a lower row when the row is found to grow slower (regardless of the current size of the bin that is closed); and (3) by allowing a fragmentation of a message to some (up to four) parts that are stored in different bins and are re-assembled before the transmission.

First the circular array method, which is the simplest from the software aspect, is described. Then the implementation of the three different schemes based upon the circular array method is described. Finally, the other methods and the possibilities to use them when implementing the three different schemes are described.

According to the circular array method, each column in $Q'_{bin}$ is implemented as a circular static array (see Aho, Hopcroft and Ullman (1983), page 58 for more details). In this implementation the data in a bin comes from only one flow and vice versa, all the backlogged data of a flow that is mapped to an arbitrary round is mapped to the same bin.

When flow i is first mapped to round j, the relevant message is stored in $Q'_{bin}$[j, LeftMost[j]] and LeftMost[j] is increased by one. In this method each entry in the array range[i] has three coordinates (though range is still a one dimension array as in the above implementations). The coordinates are range[i].row which indicates the row where the bin is placed, range[i].col which indicates the column where the bin is placed and range[i].offset which indicates the amount of data that is currently stored in the bin (i.e., the offset from the beginning of the bin in which the new message of flow i should be stored).

The size of each bin is Quantum+Max_Message_Size. Note that as arrays (static RAM) are used there might be several open bins in the same column. The hardware implementation is somewhat more complicated than simple FIFO hardware. However, it does not require dynamic memory management.

Circular Array Variable Bulk Fetch

If a complete row of bins may be transferred into a transmitting buffer in one (hardware) operation, then the equivalent of the basic fixed-length message scheme is straightforward.

The analog of the fixed-length message bulk fetch scheme, called herein "Variable Bulk fetch", is thus simply to dequeue a bin from each of the columns in one atomic operation into a transmitting buffer (dequeueing messages from each column until detecting the special marker).

Note that the permutation of the messages that are transmitted using the variable bulk fetch method is somewhat different than that obtained by the prior art DRR. This difference stems from two reasons. The first reason is that the prior art DRR keeps a consistent permutation between flows that are constantly backlogged during several consecutive rounds while in variable bulk fetch there might be a different permutation during each round. The second difference concerns flows that at the beginning of the round are backlogged but do not have any messages at row 1 (i.e., all the messages are in the transmitting buffer). In variable bulk fetch, flow fid of such a type is considered as non backlogged (as at the beginning of the round all its messages are transferred from $Q'_{bin}$ to the external buffer). Hence, following the above Observation concerning the predictability of the round in which a message will be transmitted, a new arriving message of flow fid is mapped to row 1 and the initial amount of credit for this flow is set to be Quantum. However, in the prior art DRR it is possible that when the new arriving message is received the flow is not backlogged (this might depend upon the permutation by which the scheduler scans the different queues). Hence, in this case the new arriving message can take benefit of the amount of credit indicating by credit[fid] (for example if the length of the message is smaller than credit[fid] it can be transmitted in the current round).

The first difference is similar to the one faced in the fixed-size bulk fetch scheme. The second difference is analogous to the difference between the original Round-Robin scheme (where a new arriving message can be transmitted in the current round in some scenarios) and the McKenney scheme (according to which a new arriving message is never sent during the current round).

The first difference does not violate fairness over a long time, as a permutation of messages within a round has no effect on the total fairness over a long time (i.e., after the round is terminated). The second difference may cause some reduction in the amount of bandwidth allocated to flows with small amounts of backlogged data (it might delay the transmission of data of this flow by up to a round). However, this bandwidth reduction does not accumulate over rounds. The amount of data of a flow that is delayed due to this difference turns out to be no more than Quantum+Max_Msg_Size (because when a flow has a larger amount of backlogged data then this difference can not further decrease its bandwidth allocation). Hence, it is clear that these two differences do not violate the inherent fairness in the bandwidth allocation as implied by the prior art DRR.

Circular Array Variable Individual Remove

The idea of this implementation is to go in increasing order of queue index in $Q'_{bin}$ and dequeue the messages (one at a time) from the bottom bin in each queue.

The goal is to mimic the variable bulk fetch scheme. At the beginning of each round the number of non empty bins in the bottom row (LeftMost[1]) is registered, and only these bins are fetched during the round.

As for the insert operation, consider a new message from flow fid that arrives during the current round. There are two reasons that might cause a difference between the value of range[fid].row in this scheme and the analogous value in the analogous execution of variable bulk fetch. The first possibility is analogous to that described in connection with fixed-length messages, according to which flow fid is backlogged at the beginning of the round and has not been serviced yet. Hence, we use the functions Not_Serviced_All(), Was_Serviced(fid) and Set_Serviced(fid) as in the case of fixed-length messages in order to do the correct adjustment if needed. The value of range[fid].row is decreased by one (and flow fid is considered as serviced) when the first message of that flow is serviced during that round.

Note that in the individual bulk scheme all bins are fetched at the beginning of the round. By doing this fetch the array also is circulated by one bin entry. In the variable individual remove scheme however, the circulation of each column is done somewhere at the middle of the round, after the relevant bin at the bottom row has already been fetched. Hence, in the individual variable remove scheme, when a new message of flow fid arrives, the issue of whether the column range[fid].col has already been circulated in this round must be considered.

A variable denoted as index is used that is initialized as 0 at the beginning of the round and is increased by one whenever messages start to be fetched from a new bin. A variable denoted as current_offset also is used, which indicates the amount of data that has been fetched from the bin which is indexed now. The variable current_offset is set to zero both at the beginning of the round and whenever index is increased. Whenever a new message is transmitted, current_offset is increased by the length of the transmitted message.

If range[fid].col is larger than index then the value of range[fid].row should be increased by one when calculating the row of bins in which the message should be inserted. If range[fid].col is smaller than index then the increase operation should not be done. If range[fid].col is equal to index then the value of current_offset should be considered when calculating the place in the bin (i.e. the values of range[fid].offset and current_offset should be summed), and here, too the increase operation should not be done.

Circular Array Variable Individual Round Robin

The variable individual remove scheme is modified as follows: Instead of servicing bins in each round according to their order in the bottom row of $Q'_{bin}$ (i.e., from left to right), a permutation vector is prepared for each round that maps backlogged flow id., treated as an index from an ordered set of flow indices, to the column holding the first bin of that flow. Given such a permutation vector it is now easy to remove messages (i.e., to service bins) according to a given order: Take the next flow id. in the order, find the column whose first bin is of this flow by going through the permutation vector, and remove the bin by servicing all its messages (one at a time).

The implementation is analogous to the fixed-length message implementation (where a permutation vector is kept for both the current round and the next round). However, there is an additional issue that should be considered. When inserting a message of flow fid to column range[fid].col it is necessary to know whether the column has already been circulated during the current round Hence, at the beginning of each round a function must be used that considers all columns as not circulated (analogous to the function Not_Serviced_All(). that was described in connection with fixed-length messages). When a column is circulated we have to mark this (analogous to the function Set_Serviced (fid)); and a function is needed that checks whether the column has been circulated during the current round (analogous to the function Was_Serviced(fid)). As discussed above in connection with fixed-length messages, all these functions can be implemented in constant time. The variable current_offset also is used (as in the variable individual remove) which indicates the amount of data that has been fetched from the bin which is serviced now. This variable is set to zero both at the beginning of the round and whenever a new bin is chosen to be serviced. Whenever a new message is transmitted, current_offset is increased by the length of the transmitted message. If a message is inserted to the column which is currently serviced then the value of current_offset must be considered.

Note that in this scheme there is a possibility that a new arriving message of flow fid is inserted to a bin that is located in the bottom row of $Q'_{bin}$. This might happen if at the beginning of a round flow fid is backlogged and contains messages only in the bottom row of $Q'_{bin}$. In addition, a new message should arrive during this round before flow fid is serviced and the value of credit[fid] should be larger than or equal to the length of that new arriving message.

Larger Bins

Here an alternate method is presented that implements $Q'_{bin}$ using simple FIFO hardware (rather than as a circular array).

First, the modification required in this method in order to keep the monotonous property within the rows of $Q'_{bin}$ is described. Then the implementation of the three schemes using this method is described. For every row $j \geq 1$, let active[j] denotes the number of flows that have messages stored in row j. Clearly, active[j]$\geq$active[j+1], by the monotonous property.

In this approach the following two invariants are enforced, for every row j, where $j \geq 1$:

1. If active[j]>0 then active[j]$\geq$LeftMost[j]
2. active[j+1]<LeftMost[j]

Clearly, if active[j+1]>0 then it is guaranteed by the above restrictions that LeftMost[j]>active[j+1]$\geq$LeftMost[j+1] and hence, enqueuing a message to queue LeftMost[j] turns out to be an insertion of the message to $Q'$[j,LeftMost[j]].

In order to achieve restriction (1) the bin size BS is set equal to Quantum+2·Max_Message_Size. In order to keep restriction (2) the value of active is checked whenever an entry of it is incremented. If it is observed that active[j+1] equals LeftMost[j] then the value of LeftMost[j] is increased as well (i.e., a bin is closed in round j and a new bin is opened in the same round). Note that LeftMost is initialized as 1 while active is initialized as 0.

It is clear that restriction (2) is kept. As for restriction (1), observe the bins in row j for an arbitrary round. Note that a bin is marked full either when it contains at least Quantum+Max_Message_Size bits or because the active value of the subsequent round becomes equal to the LeftMost value of that round. Let k be the index of the last bin in that row that was marked full due to the second reason (if no such bin exists k is considered to be zero). It is assured that bins k+1, k+2, etc. in row j contain data from at most active[j]–k flows (as there are at least k flows that are already mapped to row j+1 while bin k is blocked). Hence, each of bins k+1, k+2, etc. contains at least Quantum+Max_Message_Size bits. This yields that the active[j]–k flows can not cause the use of more than active[j]–k bins.

When the variable bulk fetch scheme is implemented using this method it should be notice that FIFO order is kept among all the messages that are mapped to the same round. Hence, FIFO order is also kept between messages of the same flow. Note also that only the row to which a flow is mapped is of interest. Hence the array range can be considered as an array with only one coordinate in each entry (the coordinate which corresponds to range[.].row in the case of the circular arrays).

The messages are mapped to the same rounds exactly as in the implementation of variable bulk fetch where circular arrays are used. However, the messages are transmitted during a round according to a different permutation than the one obtained before. Because the mapping to rounds is not changed, fairness is not affected. (In fact, spreading the messages of a flow over the round might even reduce the jitter.)

When implementing variable individual remove, a special marker should be placed on the top of the last bin in the first row of $Q'_{bin}$ (the left most bin that is not marked full) when starting a new round.

Using this scheme there might be some consecutive empty bins in the same row (where these consecutive bins are marked full while they are still empty). Hence, in the extreme cases (which are not likely to happen) when fetching a message from the bottom row of $Q'_{bin}$ in variable individual remove, several empty bins might be scanned before the desired message is reached. A modification of this implementation is suggested below in order to guarantee a constant time complexity to find the next non empty bin in the current round even in these cases.

Recall that in variable individual Round-Robin it was necessary to access the messages of a particular flow. To implement this scheme, an additional data repository is used that stores the messages that are transmitted in the current round. This repository is denoted current row and contains two dedicated bins denoted as in_bin and out_bin for each flow (each bin is a dedicated queue of size Quantum+Max_Message_Size). Following this concept, the bottom row of $Q'_{bin}$ contains messages that are transmitted in the next round. A pipeline mechanism is used, as illustrated in FIG. 6. During the current round a first station S1 services the messages in current row according to the cyclic order, as determined by a function "Perm". When a flow is chosen (according to the cyclic order) its messages are dequeued and transmitted (one at a time by station S1) from the appropriate in_bin and then from the appropriate out_bin. A second station S2 organizes in parallel the messages that should be transmitted in the next round according to their flow ids. Hence, there is another repository denoted as next row that stores the messages that are transmitted in the next round and has the same characteristics as current row (i.e., an in_bin and an out_in for each flow). Station S2 transfers the messages in the bottom row of $Q'_{bin}$ one at a time to the appropriate in_bin of next row (according to their flow id). As for new arriving messages, if they should be transmitted after the next round then they are stored in $Q'_{bin}$. However if they should be transmitted in either the current round or the next round then they are stored in the appropriate out_bin (of either current row or next row). At the end of each round, messages are swapped between next row and current row. A hash function can be used is order to reduce the size of current row and next row.

It is assumed that the transfer of all the messages from the bottom row of $Q'_{bin}$ to the next row is terminated before the round is finished. It also is assumed that this transfer is done on a dedicated internal bus (there is another bus that is used to insert messages to the out bins). Consider the required speed of that internal bus. Assume that at the beginning of the round there are N backlogged flows. Hence, the bottom row of $Q'_{bin}$ contains at most N·(Quantum+Max_Message_Size) bits. During this round at least N·(Quantum−Max_Message_Size) bits are transmitted. Hence, in order to guarantee the termination of that transfer until the end of the round (even in extreme cases) the speed of that bus should be at least $$\frac{N \cdot (Quantum + Max\_Message\_Size)}{N \cdot (Quantum - Max\_Message\_Size)}$$

of that of the output link. For example, if we set Quantum to be equal to 2·Max_Message_Size then this ratio should be 3.

As one can see, the implementation using FIFO hardware requires more space and some additional software mechanisms than the implementation using the circular arrays. However, one may consider the hardware implementation as simpler.

The pseudo-code for variable individual Round-Robin is presented in FIG. 7. The pseudo code uses the method of larger size bins together with the modification in Appendix B that guarantees a constant time complexity to a dequeue operation (when messages are transferred from $Q'_{bin}$ to the next row).

The pseudo-code considers sorter[0] and sorter[1] as the two rows that contain data for transmission in the current round and in the next round (i.e., current row and next row). A bit denoted as parity is used which contains the parity of the round. Whenever a new round begins, the value of parity is changed. Hence, perm[parity] is always considered as the current row, while perm[1−parity] is considered as the next row.

The pseudo code of FIG. 7 contains normal "generic" procedures and procedures in which the names have a DRR suffix. When other schedulers are used which are slightly different than DRR, as described below, then the "generic" procedures are ported as they are while the DRR procedures are replaced by procedures which are specific to the other scheduler.

Fragmentation of Messages Using FIFO Hardware

According to this idea the number of bits that are stored in a full bin is constant and hence, the bins can be considered to be of a fixed size. It is assumed that the size of the bins is at least Max_Message_Size. In this part it is assumed that each column of $Q'_{bin}$ is implemented by simple FIFO hardware.

In this approach a break of a message into more than one bin is allowed. Hence, when a message of length L in row j must be stored in $Q'_{bin}$ and the amount of space in the bin which is indicated by LeftMost[j] is L'<L, the following is done: The first L' bits of L are stored in the relevant bin, LeftMost[j] is increased by 1, and the rest of the message (i.e., the last L−L' bits) is stored in the new bin (as it is assumed that the size of a bin is at least Max_Message_Size, it is guaranteed that the new bin has enough space to accommodate the second part of the message).

In order to maintain the monotonous property, the following invariant is used as well: A flow is mapped to row j+1 after it stores exactly Quantum bits in row j. This invariant is another reason for fragmentation: Part of the a message might be stored in row j while the other part should be stored in row j+1. In fact, one message might be fragmented into up to four segments (one fragmentation in row j due to the termination of a bin, another fragmentation between two rounds and a third fragmentation in row j+1 due to a termination of a bin).

This scheme should consider the following issues concerning the fragmentation and the re-assembly of the message. When a message is fragmented, there might be some overhead in preparing the relevant two segments. The main reason is that all segments should contain the identity of the flow so that they can be re-assembled later. It is also possible that each segment should have its own header that contains some details required to control purposes, such as CRC for example.

We assume that each flow has a unique buffer of size Max_Message_Size that is used to re-assemble segments into a message (a hash function can be used such that a buffer is allocated only to active flows). When a segment is fetched from the bottom row of $Q'_{bin}$ it is assembled to previous segments that exist in the buffer of that flow. If the segments in the buffer constitute a full message, then the message is fetched from the buffer and transferred further. Note that if a message is fragmented into segments that are stored in two different rows, then the fetch of the message is done in the later round that corresponds to the upper row (this is consistent with the concept of both DRR and WFQ).

This method can be used in a straightforward way when variable bulk fetch is used (to fetch all messages of a row in one atomic operation).

At present, it is not known how this scheme can be used efficiently in the variable individual remove. This stems from the problematic scenario where one might handle several segments before assembling a full message. Hence, the transmission of the subsequent message may be delayed and can not be considered as a constant time operation.

As for variable individual Round-Robin, both current row and next row are used, where each flow has two unique bins (in_bin and out_bin) in each of these rows (exactly as in a previous implementation of variable individual Round-Robin by FIFO hardware). In this implementation the internal bus is used for two purposes. One purpose is to transfer segments to the relevant buffers of the flows while the other purpose is to transfer full messages from the buffers to the appropriate in_bin in next row. Hence, the maximum amount of data that might be transferred on that bus during a round is at most $N \cdot ((2 \cdot Quantum) + Max\_Message\_Size$ where N is the number of flows that are backlogged at the beginning of the round (during a rounds Quantum bits of each such flow may be transferred from $Q'_{bin}$ to the buffer while Quantum+Max_Message_Size bits may be transferred from the buffer to the next row). Hence, in order to guarantee the termination of that transfer until the end of the round, the speed of that bus should be $$\frac{N \cdot ((2 \cdot Quantum) + Max\_Message\_Size)}{N \cdot (Quantum - Max\_Message\_Size)}.$$

The advantage of this method is the use of simple FIFO to implement $Q'_{bin}$ and the small size required for each bin (compared with the previous methods). The Main disadvantage of this scheme is the overhead required in doing the fragmentation and re-assembly.

Fragmentation of Messages Using Circular Arrays

In this method, each column of $Q'_{bin}$ is implemented as a circular array and a fragmentation of a message between two bins is allowed. As in the circular array method, a bin can be used by exactly one flow and there might be more than one open bin in the same column of $Q'_{bin}$.

As in the previous fragmentation method, a flow is mapped to row j+1 after it stores exactly Quantum bits in row j. Hence the size of each bin can be roughly Quantum. Note that in this method a message can be fragmented to no more than two parts (one part of it is stored in the appropriate bin in row j while the other part is stored in the appropriate bin in row j+1). If the last segment in a bin does not constitute a full message then it is transferred to a buffer and re-assembled with the rest of the message in the subsequent round.

The main advantage of this method over the method that did fragmentation using FIFO hardware is the ability to implement variable individual remove. This stems from the fact that in each bin, only the last fragment does not constitute a full message by itself. Hence, we do not have to wait more that one fragment in order to transmit the subsequent message.

As for variable individual Round-Robin, it can be implemented as in the circular array method, where the only possible modification is the requirement to re-assemble two segments into one message.

The drawbacks of this system are the overhead required to do the fragmentation and re-assembly and the necessity to use static RAM.

Efficient Implementation of Weighted Fair Queuing

The scheduling techniques that have presented so far in connection with variable-length messages have been based upon the following principles:

1. The time scale can be divided to rounds.
2. A new arriving message can be mapped simply to the round in which it is transmitted.
3. FIFO order is kept between the messages of each flow.

These techniques can be used to implement other transmission mechanisms that are consistent with these principles. One of the mechanisms that can be implemented using this methodology is WFQ. Here is developed a new scheme that transmits messages in the same order as in WFQ but uses space in an efficient way as in the above schemes. The cost of each operation is of the same order as in WFQ.

The advantage of WFQ over the DRR method is the smaller jitter of WFQ. For example, A. K. Parekh and R. G. Gallagher ("A generalized processor sharing approach to flow control in integrated services networks", in Proc. 12th IEEE INFOCOMM. 1993) showed that WFQ together with a leaky bucket admission policy can provide delay guarantees.

Assume there is an imaginary flow f that is always backlogged and assume Round-Robin is implemented on a per bit transmission basis. A variable Time is used that denotes the imaginary number of bits that would have been transmitted by flow f until the current point of time. Hence, the current time is considered to happen in the Time-th bit round.

In the present implementation of WFQ, rounds of size Ouantum each are considered, where Quantum≧Max_Message_Size. The first round starts when Time equals 1 and is finished when Time equals Quantum; the second round starts when Time equals Quantum+1 and is finished when Time equals 2·Quantum; and so on. Note that each such round can also be considered as Quantum bit rounds.

As in the implementation of DRR, arrays range[.] and credit[.] are used, where range[fid].row indicates the round (relatively to the current round) to which flow fid is mapped, and where credit[fid] indicates the amount of additional credits that flow fid can use in the round to which it is currently mapped.

Throughout the following presentation of the implementation of WFQ by SMM it is assumed that the hardware is simple FIFO. However, the use of the other hardware methods presented above requires only slight modifications.

The implementation is a modification of variable individual Round-Robin where $Q'_{bin}$, current row and next row are as described above and illustrated in FIG. 6. The insertion of messages of backlogged flows into the repository (i.e., into $Q'_{bin}$, current row and next row) as well as transfer of messages from $Q'_{bin}$ to next row (the functionality of S2 in FIG. 6) are implemented exactly as in DRR. The only differences concern: (1) the insertion of a message of a non-backlogged flow and (2) the permutation according to which messages are fetched from current row for transmission (the function Perm in FIG. 6). In the following is presented the mechanism that is used in order to do the fetch (i.e., the implementation of S2 in FIG. 6).

For each backlogged flow fid, let $msg_{fid}$ be the first message received from this flow that has not been transmitted yet (i.e., the next message of the flow that should be transmitted). An array Send[.] is used, where Send[fid] indicates the bit round where the last bit of $msg_{fid}$ would have been transmitted if Round-Robin had been used on a per bit transmission time. Hence, whenever a new message should be transmitted, the transmitting scheduler locates flow ref whose (Send[ref] is minimum. Once this flow is located, the appropriate message is fetched from the bin (either in_bin or out_bin) that is allocated for that flow in current row and transmitted. In addition, the value of Time is set to be Send[fid] and if ref is still backlogged then Send[ref] is computed again (to be Time+the length of the subsequent message of flow ref). When the value of Time indicates that the round is ended, the operations required to start a new round (a change between current row and subsequent row, a marking of all backlogged flows as not serviced, etc.) are done.

Assume that a message of length L of a non backlogged flow fid is received in time Time and let Quantum_End be the bit round that indicates the termination of the current round. The value of Send[fid] is set to be Time+L. If Time+L is less than or equal to Quantum_End, then the flow is mapped to the current round, the message is stored in current row (in the out_bin that corresponds to flow fid), and credit[fid] is set to be Quantum_End−(Time+L). If Time+L is larger than Quantum_End, then the flow is mapped to the subsequent round, the message is stored in subsequent row (in the out_bin that corresponds to flow fid if FIFO hardware is used), and credit[fid] is set to be Quantum+ Quantum_End−(Time+L). As for the storage of a message of a backlogged flow, it is done exactly as described above in connection with DRR.

The pseudo code for the implementation of WFQ using SMM is similar to that presented for DRR. The "generic" procedures are used exactly as in FIG. 7. However, the DRR procedures must be replaced by procedures which correspond to the WFQ scheduler. These new procedures (with WFQ suffix) are presented in Appendix C.

Appendices
Appendix A: Proof of the Theorem

The following Lemma is a more formal representation of the Theorem:

Lemma A.1: Let K be the number of messages transmitted on an output link in a given time interval by a Round-Robin dynamic SFQ (linked list based) scheme using memory of size M on a given traffic pattern with at most F concurrently backlogged flows. Then, on the same output link, the same time interval and the same traffic pattern the following two bounds obtain:

1. The SMM scheme sends at least K messages when using memory of size $$M \cdot \sum_{l=1}^{F} \left[\frac{M}{l}\right].$$

2. The static scheme sends at least K messages when using memory of size O(M·F).

The above two bounds are tight, as shown below.

The following definition formalizes the mechanism that is implemented to handle overflow in SMM:

Definition A.2 (Dropping Policy): Assume the SMM scheme is used. When a new message of flow i arrives, it is enqueued to queue Q'[length[i]] unless this enqueue operation exceeds the envelope. Otherwise the message is dropped.

Note that the envelope is exceeded if and only if either the value of LeftMost[length[i]] is larger than F (the maximum possible number of concurrently backlogged flows is violated) or when length[i] is larger than Envelope [LeftMost[length[i]]].

Lemma A.3: Consider the SMM scheme on any traffic pattern with at most F concurrently backlogged flows. Let the envelope be: M, [M/2], [M/3], . . . , [M/F] for a given M and let the dropping policy be as specified in Definition A.2. Then, a new arriving message is dropped only if there are at least M messages currently stored in Q'.

Proof of Lemma A.3: Consider the time at which the new arriving message of flow i is dropped and let k be LeftMost [length[i]]. Note that k≦F due to the restriction on the number of concurrently backlogged flows. Hence, due to the monotonous property, it is clear that each of the k−1 left-most queues in Q' contain at least length[i] messages, while the k-th queue contains length[i]−1 message. Because of the specification of the envelope, the size of queue k (i.e., the value of length[i]−1) is [M/k]. Therefore, the number of messages that are currently stored in the memory is at least k·[M/k]+k−1≧M Corollary A.4: Consider a Round-Robin dynamic SFQ (linked list based) scheme using memory of size M on a given traffic pattern with at most F concurrently backlogged flows and with an arbitrary dropping policy. Consider the SMM scheme on the same time interval and traffic pattern when using memory of size $$\sum_{l=1}^{M} \left[\frac{M}{l}\right]$$

and the dropping policy as described in Definition A.2. Let t' be any point of time during this time interval. Then, in t' the number of messages stored in Q' when the SMM scheme is implemented is greater than or equal to the number of messages stored in the memory when the dynamic SFQ scheme is implemented.

Proof of Corollary A.4: By induction on the operations that are done when a new arriving message is inserted or when a message is removed. The statement is clearly correct at the beginning, when zero messages are stored in both schemes. As it is assumed that all messages have the same size and are transmitted during fixed time slots, it is also evident that the removal of a message does not change the invariance. As for a receipt of a new arriving message, it is clear from Lemma A.3 that the SMM scheme drops the message only if there are at least M backlogged messages, thus keeping the invariance.

Proof of Lemma A.1: By Corollary A.4 it is guaranteed to transmit in SMM no fewer messages than in the dynamic McKenney scheme.

As for the tightness of this bound, assume an alternate envelope in which there is at least one 1≦F such that Length[l] is smaller than M/l. In this case observe a possible scenario in the dynamic SFQ scheme in which there are l concurrently backlogged flows where each has exactly M/l backlogged messages. Though this scenario can be implemented by the dynamic SFQ scheme without any loss, at least one message must be lost when using the SMM scheme.

As for the static SFQ scheme, it is obvious that O(MF) space is enough to achieve the same loss ratio as in the dynamic SFQ scheme. This is done by having O(F) queues where the length of each queue is set to be M. As for the tightness of this bound, assume the scenario in which there is a point of time when an arbitrary flow has a burst of M messages while all other flows are idle, and that there is another point of time where there are exactly F flows that are concurrently backlogged such that the total amount of backlogged messages is at most M (for example if each flow has exactly one backlogged message). The dynamic SFQ scheme can handle all messages using memory of size M.

However in the static SFQ scheme it is necessary in this case to allocate at least F queues with size M each in order to avoid any loss.

Appendix B: Finding the Next Non-Empty Bin

Consider the current round. When using large bins with FIFO hardware, the invariant, according to which the k left-most bins in this round contain messages from at least k different flows, is enforced. Hence, the k left-most bins contain at least k messages.

This fact is exploited as follows. An additional queue is used that contains the indices of the non empty bins in the current round, from left to right. Initially, the queue contains only the index 1.

At the beginning of the round, or whenever a marker is found that indicates the termination of the current bin, the index of the next bin from which messages should be fetched is dequeued from the queue.

Assume N is the number of bins that were marked full for this round. For every $1 \leq n \leq N$ whenever the n-th message is fetched, bin n is checked to see if it is empty (i.e., whether the head of the bin contains the termination marker). If not, then n is enqueued to the queue.

Hence, this approach requires some small additional constant overhead when some of the first N messages are fetched. However, it is guaranteed that the next non-empty bin in the row is found immediately.

Appendix C: Pseudo-Code for Weighted Fair Queuing

The following are the modifications to the pseudo code in FIG. 7. Recall that the implementation of Weighted Fair Queuing of Demers, Keshav and Shenker (1989) computes, for each message, the time at which the switch would have completed the transmission of the message, if Round-Robin was used on a per bit transmission basis. The next message selected by the scheduler for transmission is the message with the smallest completion time. As in FIG. 7 a method of large bins and FIFO hardware is assumed.

Hence, several more variables are added to these presented in FIG. 7. The first variable, denoted as Time, is set to be the completion time of the last transmitted message. The second variable is an array Send[1 . . . #flows], where for each non-backlogged flow fid, Send[fid] represents the transmission time of the subsequent backlogged message.

There are a few issues that should be considered. The value of an entry in range[.] can be 0, as new arriving messages can be stored in current roll. In particular, if we get a new message of a non backlogged flow/fid, then range[fid] is set to be 0 and the message can be mapped to current row. Another issue is related to the amount of credit that is given to flow fid in this case which is the termination time of the current round minus the current value of Time. As each round corresponds to exactly Quantum bit rounds and the termination time of the rounds are multiples of Quantum, then the amount of credit is set to be $$\left(\text{Quantum} \cdot \left(1 + \left\lfloor \frac{\text{Time}}{\text{Quantum}} \right\rfloor\right)\right) - \text{Time}$$

It is assumed that there is a function extract_min(Send[.]) that finds the index of Send[.] where the value is minimum. This function is computed in O(log F) time complexity where F is the number of flows that are currently backlogged. The function can be implemented either by a heap (Aho, Hopcroft and Ullman, 1974, p. 87) or by a fishspear (Michael J. Fischer and Michael S. Paterson, "Fishspear: a priority queue algorithm", *Journal of the ACM,* 41(1): 3–20, January 1994).

The value of Time at the beginning of a round is stored in a new variable denoted as Start_Time. As each round corresponds to Quantum bit rounds then the indication for the termination of a round is given when Start_Time/Quantum is different than Time/Quantum.

Another array Last_Send[1 . . . #flows] is used, where for each flow fid, Last_Send[fid] is the time when the previous message of that flow has been transmitted.

When a message of flow fid should be transmitted, it is sought at the current round. First, the in_bin is checked, and if that bin is empty the out_bin is checked. After the message is transmitted Last_Send[fid] is modified to be Time.

In this stage the next message of flow fid is located and Send[fid] is updated accordingly. The next message is sought in the following order: First in the in bin of current row, second in the out_bin of current row, third in the in_bin of subsequent row and last in the out_bin of subsequent row. The first message that is found in this search is the next to be transmitted by flow fid. If the search fails then the value of Send[fid] is set to be $\infty$ ("infinity") as it cannot be computed at the moment.

There are two cases in which the correct next message cannot be located in this search. One case occurs if flow fid becomes non-backlogged. In this case flow fid does not contain any backlogged message in the repository and the search fails. The other case is if the next message to be sent is currently found in the bottom row of $Q'_{bin}$. This case has two possible scenarios. In one scenario the search fails while in the other scenario the message to be found during the search is placed in the out_bin of subsequent row (i.e., it is possible that the value of Send[fid] gets a temporary wrong value).

When considering the first case, note that when a flow becomes backlogged then the value of Send is correctly updated. As for the second case note that the next message of flow fid (which is currently found in the bottom row of $Q'_{bin}$) should be transmitted in the next round. Hence it is guaranteed that this message is transferred to the in_bin of subsequent row until the end of the round. Based on this observation, when a message of flow fid is stored in the in_bin of subsequent row (in procedure Insert_Sorter_WFQ) it is checked whether this is the next message to be transmitted by that flow. If this is the case then the value of Send[fid] is updated according to this message.

Note that the length of the arrays Send and Last_Send can be reduced if a hash function is used.

FIG. 8 shows pseudo-code for the functions that are specific to WFQ.

While the invention has been described with respect to a limited number of embodiments, it will be appreciated that many variations, modifications and other applications of the invention may be made.

What is claimed is:

1. A method for allocating space in a memory for storing messages of equal length to be transmitted via an output port of a link, and then transmitting the messages, each of the messages being associated with a flow having a flow index, the flow indices being in a certain order, the method comprising the steps of:

(a) dividing the memory among a plurality of queues, each of said queues having at least one location, each of said locations being at least as long as one of the messages, at least one of said queues having a maximum number of said locations, and at least one of said queues having a number of said locations less than said maximum number of said locations, each of said locations in one of said queues having an ordinal index within said queue;

(b) storing each of the messages in one of said queues so that each message of a flow is stored in a location having a different ordinal index than any other location used to store any other message of said flow; and (c) for each of said queues in which at least one message is stored, transmitting said message that is stored in said location that has a lowest ordinal index.

2. The method of claim 1, wherein, if a flow has only one message, said only one message is stored in a location having said lowest ordinal index.

3. The method of claim 1, wherein each of said queues has a different number of said locations.

4. The method of claim 1, wherein each of said queues has a queue index, wherein a single longest of said queues has said maximum number of said locations, and wherein each of said queues that is shorter than said longest queue has a number of said locations equal to said maximum number divided by said queue index of said queue and truncated to an integer.

5. The method of claim 4, wherein said queue indices are consecutive integers, said queue index of said longest queue being 1.

6. The method of claim 1, wherein said step of transmitting said messages is effected by steps including moving said messages from said locations of lowest ordinal index, substantially simultaneously, to a transmission buffer.

7. The method of claim 1, wherein said step of transmitting said messages is effected by steps including sequentially retrieving said messages from said locations of lowest ordinal index.

8. The method of claim 7, wherein each of said queues has a queue index, said queue indices being in a certain order, and wherein said sequential retrieval is effected in said order of said queue indices.

9. The method of claim 7, wherein each of said queues has a queue index, said queue indices being in a certain order, and wherein said sequential retrieval is effected in a permutation of said order of said queue indices.

10. The method of claim 7, wherein said sequential retrieval is effected in the order of the flow indices.

11. The method of claim 7, wherein said sequential retrieval is effected in a permutation of the order of the flow indices.

12. The method of claim 11, wherein said permutation is a Round Robin permutation.

13. The method of claim 11, wherein said sequential retrieval emulates Stochastic Fair Queuing.

14. A method for allocating space in a memory for storing messages to be transmitted via an output port of a link, and then transmitting the messages, each message having a certain length bounded above by a maximum message length, each message being associated with a flow having a flow index, the flow indices being in a certain order, the method comprising the steps of:

(a) dividing the memory among a plurality of queues, each of said queues having a queue index, each of said queues having at least one bin, at least one of said queues having a maximum number of said bins, and at least one of said queues having a number of said bins less than said maximum number of said bins, each of said bins having an ordinal index within said queue;

(b) for each message, computing a transmission round in which the message is to be transmitted;

(c) for each message, storing the message in at least one of said bins whose ordinal indices are related to said transmission round, so that, for said queues of said at least one of said bins whose ordinal indices are related to an earlier transmission round and in which at least a part of at least one of the messages to be transmitted in said earlier transmission round is stored, a largest of said queue indices is at least as great as a largest of said queue indices of said queues of said at least one of said bins whose ordinal indices are related to a later transmission round and in which at least a part of at least one of the messages to be transmitted in said later transmission round is stored; and (d) for each of said queues in which at least part of one of the messages is stored in said bin having a lowest ordinal index, retrieving said at least part of said one of the messages for transmission.

15. The method of claim 14, wherein each of said queues has a different number of said bins.

16. The method of claim 15, wherein a single longest of said queues has said maximum number of said bins, and wherein each of said queues that is shorter than said longest queue has a number of said bins equal to said maximum number divided by said queue index of said queue and truncated to an integer.

17. The method of claim 16, wherein said queue indices are consecutive integers, said queue index of said longest queue being 1.

18. The method of claim 14, wherein all of said bins are equal in size, said bin size being at least as great as the maximum message length.

19. The method of claim 14, wherein all of each message is stored in one of said bins.

20. The method of claim 19, wherein all the messages stored in one of said bins are associated with the same flow.

21. The method of claim 14, wherein said step of retrieving said at least part of the one of the messages from each of said queues, in which said at least part of one of the messages is stored in said bin having said lowest ordinal index, is effected substantially simultaneously for all of said queues.

22. The method of claim 14, wherein said step of retrieving said at least part of the one of the messages from each of said queues, in which said at least part of one of the messages is stored in said bin having said lowest ordinal index, is effected sequentially.

23. The method of claim 22, wherein said queue indices are in a certain order, and wherein said sequential retrieval is effected in said order of said queue indices.

24. The method of claim 22, further comprising the step of:

(e) mapping said queue indices into the flow indices.

25. The method of claim 24, further comprising the step of:

(f) transmitting the retrieved messages in the order of the flow indices.

26. The method of claim 24, further comprising the step of:

(f) transmitting the retrieved messages in a permutation of the order of the flow indices.

27. The method of claim 26, wherein said transmitting emulates Deficit Round Robin.

28. The method of claim 26, wherein said transmitting emulates Weighted Fair Queuing.

* * * * *